(12) United States Patent
McCormick

(10) Patent No.: US 12,172,875 B2
(45) Date of Patent: Dec. 24, 2024

(54) HEAVY-DUTY DOOR JACK AND DOLLY

(71) Applicant: John A. McCormick, Lake Villa, IL (US)

(72) Inventor: John A. McCormick, Lake Villa, IL (US)

( * ) Notice: Subject to any disclaimer, the term of this patent is extended or adjusted under 35 U.S.C. 154(b) by 0 days.

(21) Appl. No.: 18/600,091

(22) Filed: Mar. 8, 2024

(65) Prior Publication Data
US 2024/0300787 A1    Sep. 12, 2024

Related U.S. Application Data

(60) Provisional application No. 63/489,577, filed on Mar. 10, 2023.

(51) Int. Cl.
*B66F 5/02*    (2006.01)
*B62B 1/26*    (2006.01)
*B62B 3/10*    (2006.01)

(52) U.S. Cl.
CPC .............. *B66F 5/02* (2013.01); *B62B 1/268* (2013.01); *B62B 3/108* (2013.01)

(58) Field of Classification Search
CPC . B66F 5/02; B66F 19/00; B62B 1/268; B62B 1/108; E04F 21/0023
See application file for complete search history.

(56) References Cited

U.S. PATENT DOCUMENTS

| | | | |
|---|---|---|---|
| 2,967,627 A | | 1/1961 | Vinson |
| 4,050,671 A | * | 9/1977 | Coleman .................. B62B 3/108 254/7 R |
| 6,752,404 B1 | * | 6/2004 | Blake .................... B62B 5/0442 280/47.27 |
| 9,371,655 B1 | * | 6/2016 | Davis .................. E04F 21/0007 |
| 10,988,155 B2 | * | 4/2021 | Kalinowski ........... B62B 3/0625 |
| 2007/0284501 A1 | * | 12/2007 | Liu .......................... F16F 1/127 248/352 |
| 2011/0020099 A1 | * | 1/2011 | Hollins ................. B62B 5/0003 414/334 |

(Continued)

FOREIGN PATENT DOCUMENTS

ES    2419182 A1    8/2013

OTHER PUBLICATIONS

International Search Report and Written Opinion in PCT/US24/19135, mailed Jul. 24, 2024, 10 pages.

*Primary Examiner* — Seahee Hong
(74) *Attorney, Agent, or Firm* — McKee, Voorhees & Sease, PLC

(57) ABSTRACT

A jack and dolly assembly provides for easy, efficient, and effective transportation and installation of heavy items such as a door, a panel, and the like. The assembly is adapted to provide the ability for one person to quickly, easily, efficiently, and effectively load, install hardware upon, store, transport, lift, position, uninstall, and/or install an object. The assembly is adapted to include adjustable components such that the assembly can accommodate different sizes of objects. According to some embodiments, the assembly includes a frame, carrying arm, and securing mechanism for holding/securing the object, and a pair of large wheels for easily transporting the object. The assembly is further adapted to provide the ability to lift an object and properly hold the object in place during installation.

16 Claims, 13 Drawing Sheets

(56) References Cited

U.S. PATENT DOCUMENTS

2011/0052357 A1   3/2011   Torrison
2011/0214274 A1   9/2011   Holder
2017/0143571 A1   5/2017   Wilson et al.

\* cited by examiner

HEAVY-DUTY DOOR JACK AND DOLLY

CROSS REFERENCE TO RELATED APPLICATIONS

This application claims priority under 35 U.S.C. § 119 to provisional patent application U.S. Ser. No. 63/489,577, filed Mar. 10, 2023. The provisional patent application is herein incorporated by reference in its entirety, including without limitation: the specification, claims, and abstract, as well as any figures, tables, appendices, or drawings thereof.

FIELD OF THE INVENTION

The present invention relates generally to an apparatus and/or a corresponding method of use/manufacture having applications in at least the construction and/or moving/packing/carrier business. More particularly, but not exclusively, the present invention relates to a jack, dolly, transportation device, manipulation device, and/or installation device for transporting, manipulating, installing and/or uninstalling large and/or heavy items including, but not limited to, a door, a panel, and the like.

BACKGROUND OF THE INVENTION

The background description provided herein gives context for the present disclosure. Work of the presently named inventors, as well as aspects of the description that may not otherwise qualify as prior art at the time of filing, are neither expressly nor impliedly admitted as prior art.

Constructing, remodeling, and/or repairing a building is a large undertaking. The construction process involves many moving parts. Different components and equipment used throughout the construction process often need to be transported to different locations within a construction site. Such transportation of components and/or equipment often requires manpower. Additionally, construction often involves uninstalling and/or installing large, heavy objects such as doors, paneling, and the like.

Currently, the industry lacks an effective device to transport and/or install heavy and/or large components such as a door of a building. Transporting, installing, and/or uninstalling heavy objects in a construction site is often a laborious task that requires the attention and brawn of multiple people. Transporting, installing, and/or uninstalling heavy items can also be time consuming and sometimes can result in inadvertent damage to the item that is being transported, installed, and/or uninstalled. Additionally, the industry currently lacks an easy and efficient way to install a door without using shim(s).

Thus, there exists a need in the art for an apparatus, method, and/or system that provides the ability to easily, efficiently, and effectively transport, uninstall, and/or install heavy components, such as a door, a panel, and the like. More specifically, there exists a need in the art for an apparatus, method, and/or system that provides the ability to transport heavy object(s) with speed, ease, and efficiency wherein only one person is needed for such transportation. There exists a need in the art for an apparatus, method, and/or system that allows for a heavy object to be easily, quickly, and efficiently transported in and/or through an elevator, doorway, hallway, and on all types of terrain. There exists a need in the art for an apparatus, method, and/or system that increases installation/uninstallation productivity/efficiency such that only one person is needed to uninstall and/or install a heavy item. There exists a need in the art for an apparatus, method, and/or system that provides the ability to transport, install, uninstall, and/or otherwise handle heavy objects without damaging them. There exists a need in the art for an apparatus, method, and/or system that provides the ability to easily, efficiently, and effectively install a door without using shim(s).

SUMMARY OF THE INVENTION

The following objects, features, advantages, aspects, and/or embodiments, are not exhaustive and do not limit the overall disclosure. No single embodiment need provide each and every object, feature, or advantage. Any of the objects, features, advantages, aspects, and/or embodiments disclosed herein can be integrated with one another, either in full or in part.

It is a primary object, feature, and/or advantage of the present invention to improve on or overcome the deficiencies in the art.

It is a further object, feature, and/or advantage of the present invention to provide apparatus(es), method(s), and/or system(s) that provides the ability to easily, efficiently, and effectively secure, transport, uninstall, and/or install heavy components, such as a door, a panel, and the like.

It is still yet a further object, feature, and/or advantage of the present invention to provide apparatus(es), method(s), and/or system(s) that provides the ability to transport heavy object(s) with speed, ease, and efficiency wherein only one person is needed for such transportation.

It is still yet a further object, feature, and/or advantage of the present invention to provide apparatus(es), method(s), and/or system(s) that allows for a heavy object to be easily, quickly, and efficiently transported in and/or through an elevator, doorway, hallway, and on many types of terrain.

It is still yet a further object, feature, and/or advantage of the present invention to provide apparatus(es), method(s), and/or system(s) that increases installation productivity/efficiency such that only one person is needed to install a heavy item.

It is still yet a further object, feature, and/or advantage of the present invention to provide apparatus(es), method(s), and/or system(s) that provides the ability to transport, install, and/or otherwise handle heavy objects without damaging them.

It is still yet a further object, feature, and/or advantage of the present invention to provide apparatus(es), method(s), and/or system(s) that provides the ability to eliminate and/or reduce work related injuries due to lifting of heavy objects.

It is still yet a further object, feature, and/or advantage of the present invention to provide apparatus(es), method(s), and/or system(s) that provides the ability to easily, efficiently, and effectively install a door without using shim(s).

It is still yet a further object, feature, and/or advantage of the present invention to provide apparatus(es), method(s), and/or system(s) that provides the ability for one person to load, install hardware upon, store, transport, lift, position, uninstall, and/or install a heavy object such as a door.

The apparatus(es), method(s), and/or system(s) disclosed herein can be used in a wide variety of applications. For example, the jack and dolly device can be used to secure, transport, and/or install many different objects including, but not limited to doors, panels, windows, tiles, boards, sheets, slabs, and the like.

It is preferred the apparatus be safe, cost effective, and durable. For example, the jack and dolly device can be adapted to resist failure (e.g., cracking, crumbling, shearing, creeping) due to excessive and/or prolonged exposure to tensile, compressive, and/or balanced forces acting on the device. The device can be further adapted to be resistant to fire. Additionally, the device increases safety by reducing job related injuries caused by the lifting of heavy objects.

At least one embodiment disclosed herein comprises a distinct aesthetic appearance. Ornamental aspects included in such an embodiment can help capture a consumer's attention and/or identify a source of origin of a product being sold. Said ornamental aspects will not impede functionality of the present invention.

Methods can be practiced which facilitate use, manufacture, assembly, maintenance, and/or repair of a jack and dolly device which accomplish some or all of the previously stated objectives.

The jack and dolly device can be incorporated into systems, kits, and/or larger designs which accomplish some or all of the previously stated objectives.

According to some aspects of the present disclosure, a jack and dolly assembly to aid in securing, transporting, and/or installing an object, comprises a frame; a carrying arm supported by the frame; a securing mechanism mounted on the carrying arm wherein the securing mechanism is adapted to receive at least a portion of an object; and an adjustable member in operable communication with the securing mechanism such that the securing mechanism can be manipulated by adjusting the adjustable member.

According to at least some aspects of some embodiment disclosed, the jack and dolly assembly further comprises one or more adjustable legs extending from a first side of the frame wherein the one or more adjustable legs are adapted to be able to extend and retract.

According to at least some aspects of some embodiment disclosed, the jack and dolly assembly further comprises one or more stabilizing arms, each mounted to one of the one or more adjustable legs.

According to at least some aspects of some embodiment disclosed, the jack and dolly assembly further comprises one or more securing wheels, each securing wheel mounted to one of the one or more stabilizing arms, wherein the one or more securing wheels are adapted to receive at least a portion of the object.

According to at least some aspects of some embodiment disclosed, the jack and dolly assembly further comprises a plurality of transportation wheels.

According to at least some aspects of some embodiment disclosed, the plurality of transportation wheels comprises a first lower rear wheel assembly and a second lower rear wheel assembly located at or near a corner of the frame formed where a first side and a second side of the frame meet.

According to at least some aspects of some embodiment disclosed, the first and second rear wheel assemblies are spring loaded.

According to at least some aspects of some embodiment disclosed, the plurality of transportation wheels comprises, a first front wheel, a second front wheel, a first upper wheel, and a second upper wheel wherein the front wheels are located at or near a distal end of a first side of the frame and the upper wheels are located at or near a distal end of a second side of the frame.

According to at least some aspects of some embodiment disclosed, the plurality of transportation wheels comprises a first large wheel and a second large wheel, wherein the first and second large wheels are pneumatic rubber tires adapted to be able to traverse many types of terrain and further wherein the first and second wheels are located at or near a corner of the frame formed where first and second sides of the frame meet. The first and second large wheels can be pneumatic wheels that are 13.5 inches in diameter.

According to at least some aspects of some embodiment disclosed, the jack and dolly assembly further comprises a brake assembly mounted on the frame wherein the brake assembly is in operable communication with at least one of the large wheels.

According to at least some aspects of some embodiment disclosed, the jack and dolly assembly further comprises a foot member detachably mounted to the carrying arm, wherein the foot member is adapted to receive at least a portion of the object.

According to at least some aspects of some embodiment disclosed, the jack and dolly assembly further comprises a side adjustment rod mounted to the frame via an adjustment plate wherein the side adjustment rod is adapted to provide the ability to adjust the carrying arm.

According to at least some aspects of some embodiment disclosed, the jack and dolly assembly further comprises a lower adjustment rod mounted to the frame wherein the lower adjustment rod is adapted to provide the ability to adjust the carrying arm.

According to at least some aspects of some embodiment disclosed, a transportation and installation tool for use at a construction site, comprises a frame wherein the frame is shaped generally as a capital letter "L" and comprises a first side and a second side; a carrying arm supported by the frame; a securing mechanism mounted on the carrying arm wherein the securing mechanism is adapted to receive at least a portion of an object; and a plurality of transportation wheels configured to allow the tool to be portable; wherein the plurality of transportation wheels is adapted to allow the tool to be transported in a vertical position and in a horizontal position.

According to at least some aspects of some embodiment disclosed, the plurality of transportation wheels comprises a first upper wheel and a second upper wheel, each located at or near a distal end of the second side of the frame.

According to at least some aspects of some embodiment disclosed, the tool further comprises a first adjustable leg and a second adjustable leg, each extending from the first side of the frame wherein the adjustable legs are adapted to be able to extend and retract.

According to at least some aspects of some embodiment disclosed, the plurality of transportation wheels comprises a first front wheel and a second front wheel, wherein the first front wheel is located at a distal end of the first adjustable leg and the second front wheel is located at a distal end of the second adjustable leg.

According to at least some aspects of some embodiment disclosed, the plurality of transportation wheels comprises a first large wheel and a second large wheel, each located at or near a corner of the frame where the first and second sides of the frame meet.

According to at least some aspects of some embodiment disclosed, the plurality of transportation wheels comprises a first lower rear wheel and a second lower rear wheel, wherein the first lower rear wheel is positioned adjacent to the first large wheel and the second lower rear wheel is positioned adjacent to the second large wheel.

According to at least some aspects of some embodiment disclosed, a caddy assembly to aid in transportation and installation of objects for use at a construction site, comprises a frame; and a carrying arm supported by the frame; a securing mechanism mounted on the carrying arm wherein the securing mechanism is adapted to receive at least a portion of an object; wherein positioning of the carrying arm can be adjusted.

According to at least some aspects of some embodiment disclosed, the size of the front wheels can be minimized by mounted a mini-frame to the These and/or other objects, features, advantages, aspects, and/or embodiments will become apparent to those skilled in the art after reviewing the following brief and detailed descriptions of the drawings. Furthermore, the present disclosure encompasses aspects and/or embodiments not expressly disclosed but which can be understood from a reading of the present disclosure, including at least: (a) combinations of disclosed aspects and/or embodiments and/or (b) reasonable modifications not shown or described.

BRIEF DESCRIPTION OF THE DRAWINGS

Several embodiments in which the present invention can be practiced are illustrated and described in detail, wherein like reference characters represent like components throughout the several views. The drawings are presented for exemplary purposes and may not be to scale unless otherwise indicated.

Figure 1:
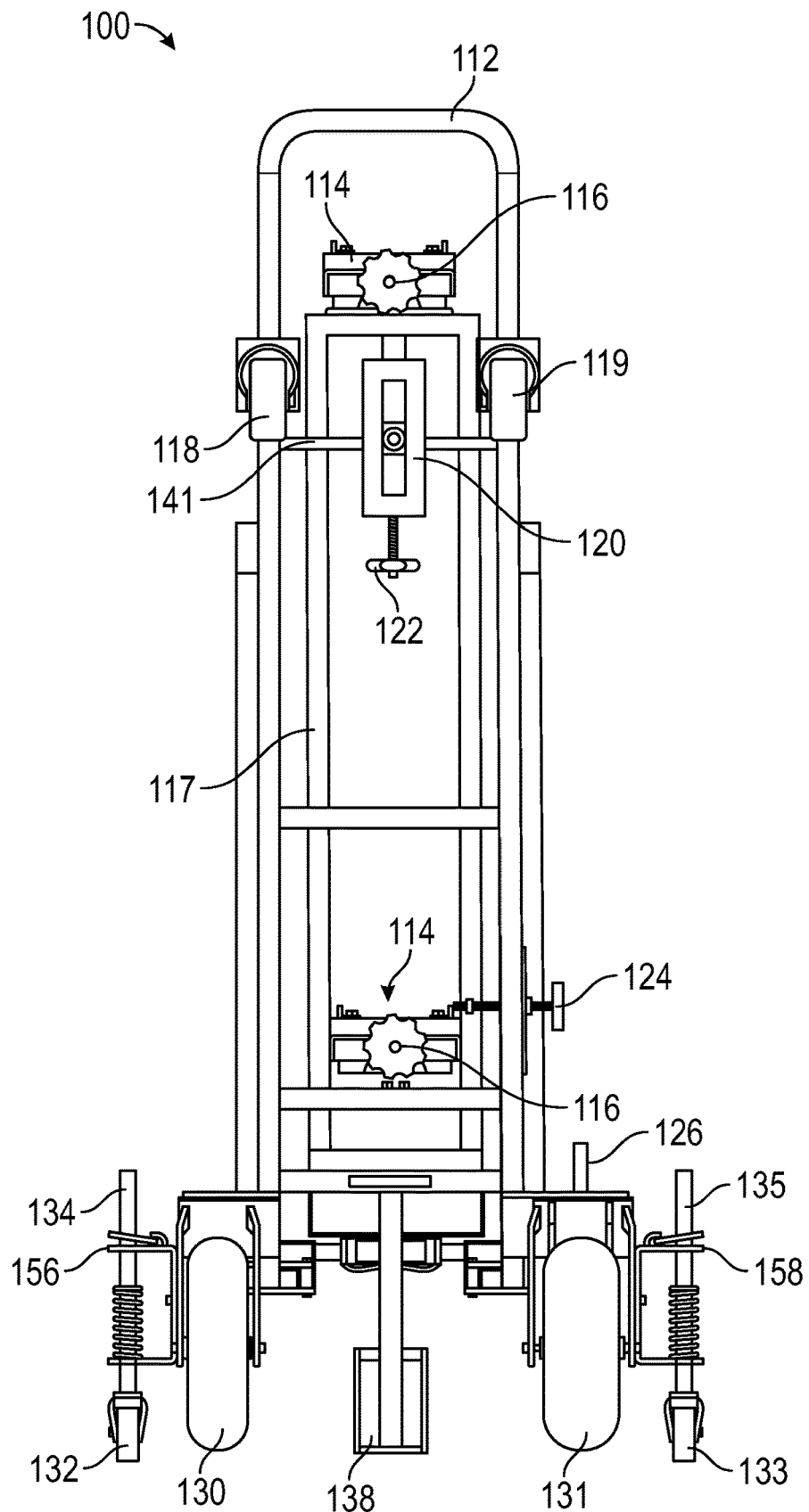
FIG. 1 shows a rear elevation view of a jack and dolly device in a vertical position.

An artisan of ordinary skill in the art need not view, within isolated figure(s), the near infinite number of distinct permutations of features described in the following detailed description to facilitate an understanding of the present invention.

DETAILED DESCRIPTION OF THE INVENTION

The present disclosure is not to be limited to that described herein. Mechanical, electrical, chemical, procedural, and/or other changes can be made without departing from the spirit and scope of the present invention. No features shown or described are essential to permit basic operation of the present invention unless otherwise indicated.

Referring now to the Figures, FIGS. 1-5 show an embodiment of a jack and dolly device 100. The embodiment of FIGS. 1-5 comprises a frame 112 (wherein the frame 112 comprises a first side 160, a second side 162, a first diagonal bar 164, and a second diagonal bar 166), a securing mechanism 114, a lock 115, a knob 116, a carrying arm 117, a first upper wheel 118, a second upper wheel 119, a fulcrum frame 120, an adjustable member (associated with the fulcrum frame) 122, a side adjustment rod 124, an adjustment plate 125, a brake handle 126, a first attachment plate 128, a second attachment plate 129, a first large wheel 130, a second large wheel 131, a first lower rear wheel 132, a second lower rear wheel 133, a first lower rear wheel assembly 134, a second lower rear wheel assembly 135, a lower securing assembly 136, a foot member 138, a fulcrum block 140, a fulcrum bar 141, a brake assembly 142, a first holding pin 144, a second holding pin 145, a first adjustable leg 146, a second adjustable leg 147, a first front wheel 148, a second front wheel 149, a first securing wheel 150, a second securing wheel 151, a first stabilizing arm 152, a second stabilizing arm 153, a lower adjustment rod 154, a first lower rear lock 156, and a second lower rear lock 158.

The embodiment of FIGS. 1-5 includes a frame 112 wherein the shape of the frame 112 of the embodiment shown in FIGS. 1-5 generally resembles the shape of a capital "L", however any suitably shaped frame can be used. The frame 112 can include two generally straight sides, a first side 160 and a second side 162, that are perpendicular to each other wherein the two sides meet to generally form a corner and an "L" shape. Both the first side 160 and second side 162 can be of any suitable length, width, size, and/or shape. The frame 112 can further include a first diagonal bar 164 and a second diagonal bar 166. One end of the first diagonal bar 164 can be mounted to the first side 160 and the other end of the first diagonal bar 164 can be mounted to the second side 162. Similarly, one end of the second diagonal bar 166 can be mounted to the first side 160 and the other end of the second diagonal bar 166 can be mounted to the second side 162. The diagonal bars 164/166 provide stability to the frame 112 and any object/door held by the device 100. The diagonal bars 164/166 also provide protection to any object/door held by the device 100. While the embodiment of FIGS. 1-5 includes two diagonal bars 164/166, any number of diagonal bars could be included ranging from zero to N where N is any number greater than zero. According to some embodiments, the frame 112 is a rectangular steel tube frame with dimensions of 1 inch×1 inch with varying length. According to some embodiments, the frame 112 is a circular steel tube frame having a 1-inch diameter. However, the frame 112 can be any suitable shape and/or size. According to some embodiments, the frame 112 can be constructed of any suitable material including, but not limited to, metal, wood, plastic, and the like. According to some embodiments, the frame 112, and device 100 as a whole, is fire rated such that it is resistant to fire. The frame 112, and device 100 as a whole, is capable of lifting, securing, holding, transporting, uninstalling, and/or installing heavy objects, such as doors. The device 100 is capable of lifting, securing, holding, transporting, uninstalling, and/or installing objects weighing up to at least 350 pounds.

The embodiment shown in FIGS. 1-5 includes one or more securing mechanisms 114. In some embodiments, a particularly beneficial number of securing mechanisms is two, with one securing mechanism located at one end of the device 100 and another securing mechanism 114 located at the opposite end of the device 100.

The securing mechanism 114 can be mounted on the carrying arm 117 and can be configured to receive at least a portion of an object wherein the object can be secured, held in place, and/or positioned via the securing mechanism 114. The securing mechanism 114 can comprise holding cams/disks, such as swivel holding cams, as shown in FIGS. 1-5. The securing mechanism, according to some embodiments, includes opposing surfaces (cams in FIGS. 1-5) wherein a portion of an object can be placed between such surfaces. The opposing surfaces of the securing mechanism 114 can be circular/wheel-like and/or half-circle/half-wheel-like members, however such surfaces could also be flat or any other suitable shape and/or configuration. The surfaces can then tighten and/or contract to secure, hold in place, and/or position the object. While the securing mechanism 114 shown in FIGS. 1-5 uses holding cams, the securing mechanism 114 does not need to include opposing surfaces and can be any suitable component capable of receiving at least a portion of an object so that it can secure, hold in place, and/or position said object. Examples of components that can be used as a securing mechanism include, but are not limited to, a clamp, a cinch, brackets, bindings, and the like. The securing mechanism 114 provides the ability to rapidly and easily secure/clamp and release an object such as a door, panel, and the like. According to some embodiments, the securing mechanism 114 can include a protective lining, such as rubber or any other suitable lining, such that transporting and/or installing an object with the device 100 will not damage the object. Thus, the device 100 can transport and/or install pre-finished objects. This increases productivity and efficiency.

The embodiment shown in FIGS. 1-5 includes a lock 115. According to some embodiments, the lock 115 can include a component that is pushed-in to lock the carrying arm 117 and/or the securing mechanism 114 and pulled out to release and/or unlock the securing mechanism 114 and/or carrying arm 117. When at least a portion of an object is received by the securing mechanism 114, a user can tighten and/or contract the securing mechanism 114 to secure, hold in place, and/or position the object, and then a user can push a component of the lock 15 to lock the securing mechanism 114 and/or the carrying arm 117. A user can then pull a component of the lock 115 to unlock the securing mechanism 114, and/or carrying arm 117, such that the securing mechanism 114 can then be loosened and/or expanded when it is desired to remove the object from the securing mechanism. Any suitable locking mechanism can be used for the lock 115.

The embodiment shown in FIGS. 1-5 includes a knob 116. The knob 116 can be mounted on the carrying arm 117 and can include an adjustable member (adjusted by twisting the knob 116) configured to engage/contact the object received, secured, held in place, and/or positioned by the securing mechanism 114. For example, according to some embodiments, the object inserted into the securing mechanism 114 can protrude from both sides of the securing mechanism 114 while being secured by the opposing surfaces of the securing mechanism 114. The adjustable member of the knob 116 can then be adjusted, by twisting the knob 116, such that it engages a portion of the object snugly to provide more stability and/or to properly position the object. For example, the adjustable member of the knob 116 can engage the object in the securing mechanism 114 to move the object to a desired position. When it is desired to remove the object from the securing mechanism 114, a user can twist the knob 116 such that it disengages the object. Further, the adjustable member of the knob 116 that contacts the object/door can include a protective lining, such as rubber or any other suitable lining, such that transporting and/or installing an object with the device 100 will not damage the object.

The embodiment shown in FIGS. 1-5 includes a carrying arm 117. The carrying arm 117 is supported by the frame 112 and serves as a moveable/adjustable frame member. The height, alignment, angle, and/or position (horizontal and vertical) of the carrying arm 117 is adjustable via components of the device 100. The carrying arm 117 is capable of being swung and/or adjusted in two planes via the components of the device 100. According to some embodiments, the carrying arm 117 comprises the securing mechanism 114, the lock 115, the knob 116, the fulcrum frame 120, the adjustable member 122, the foot member 138, the fulcrum block 140, and/or the fulcrum bar 141. The carrying arm 117 can be adjusted such that the object secured by the securing mechanism 114 is positioned desirably. For example, the device 100 can be used to install an object, such as a door. According to some embodiments, the device 100 can also be used to remove/uninstall an object, such as a door.

When installing an object/door, a user can place a portion of the object/door in the foot member 138 and then position the object/door so that it is received by the securing mechanism 114. A user can engage the stabilizing arms 152/153 such that at least a portion of the object/door is received and stabilized by the lower securing wheels 150/151. The device 100 uses leverage to lift an object/door and hold it in place. A user can manipulate the position of the carrying arm 117 such that the object which is held in the securing mechanism 114 and is supported by the carrying arm 117, and/or components thereof, is at the proper height, alignment, angle, and/or position (vertical and/or horizontal) to allow the user to install the object/door. This includes, but is not limited to, proper vertical position, proper horizontal position, proper angles in multiple planes, proper level, proper plumb positioning, and the like. For example, according to some embodiments, a user can adjust the positioning of the foot member 138 and/or the carrying arm 117 in order to adjust the plumb level so that the hinges are positioned properly corresponding to the door jamb. Additionally, a user can engage lower rear wheels 132/133 so that they are lowered to the ground to provide sideways movement to properly place the device 100. According to some embodiments, the object/door can be positioned at a hinge pin. A user can install hardware on the door and/or door frame, door jamb, and the like such as knob(s), hinges, knocker(s), handle(s), latches, and the like, while the device 100 holds the door at the proper height, alignment, angle and/or position in the door frame. For example, the device 100 can hold a door in place to set the hinges and then adjust up and/or down to set the hinges to the door jamb and/or to the door. The device 100 can hold the door in place so that a user can remove pin(s) from the hinge and/or remove screw(s) from the door jamb. A user can also plane, mill, machine, mortise, tenon, drill, strip, and/or perform any other action on the object/door while it is aligned in the door frame or at another location. When the device 100 and components thereof are manipulated such that the object/door held by the device is properly aligned and positioned in a door frame to facilitate installation, the object/door can be positioned plumb to the hinge side of the door jamb. According to some embodiments, the carrying arm 117, and/or the object/door, can travel plus or minus 5 degrees if the door frame is out of plumb. According to some embodiments, the carrying arm 117, and/or object/door, has an angle of travel lesser or greater than 5 degrees. Additionally, the device 100 can be used to transport, uninstall, and/or install an object/door on unlevel floors and/or subfloors. The device 100 still functions properly on such unlevel floors and/or subfloors. The device 100 can also be used for shipping objects/doors wherein the device 100 can secure and hold the object/door in place while it is being shipped such as by truck, train, boat, and the like.

The device 100 is compatible for use with many different types of hinges when installing a door. For example, the device 100 is compatible with leaf hinges, gear hinges, butt hinges, spring loaded hinges, ball bearing hinges, barrel hinges, concealed hinges, overlay hinges, offset hinges, piano hinges, strap hinges, security hinges, continuous hinges, and/or any combination thereof. The device 100 provides the ability to properly position and install a door that uses any type of hinge without the need for shim(s), even when the hinge leaves are open.

By being able to adjust the carrying arm 117, the device 100 provides the ability to install a door such that it is level and plumb without the use of shim(s) or any other items such as straps. Additionally, by using the device 100 for door installation, a user can begin the installation process and then if the user is forced to pause the process and leave, the device 100 will still hold the door in the door frame at the proper height, alignment, angle, and/or position. Therefore, upon the user's return, the user can continue the installation process from the point at which he or she paused. Without the use of the device 100, beginning door installation, pausing, and then returning would require lifting the door, setting it down, and lifting again. In this way, the device 100 increases productivity and efficiency and also increases safety by reducing and/or eliminating injuries suffered by lifting heavy objects. While a user can manually adjust the horizontal and/or vertical position of the object/door and/or the carrying arm 117, the device 100 is also self-leveling in that it automatically levels itself, automatically positions itself in the plumb position, and automatically provides the proper positioning needed to uninstall and/or install a door. Thus, the device allows for a single user, without help from another, to uninstall and/or install a door or other object (manually and/or automatically) quickly, efficiently, effectively, and safely.

The device 100 can hold an object/door in place (i.e., serve as a holding clamp), either in a door frame or at another location, while a user performs actions on the object/door. In this way, the device can function as a work station wherein a user can perform actions on an object/door secured by the device 100. For example, a user could use the device 100 to secure and hold in place an object/door while the user installs hardware on said object/door including but not limited to knob(s), hinges, knocker(s), handle(s), latches, and the like. Additionally, while an object/door is secured and/or held in place by the device 100, a user can plane the object/door, mill the object/door, machine the object/door, mortise the object/door, tenon the object/door, perform drilling/boring on the object/door, perform millwork on the object/door, perform stripping on the object/door, and/or perform any other actions to the object/door. Additionally, the device 100 can act as a tool hauler wherein any tools, equipment, accessories, and/or materials used to perform planning, milling, machining, mortise work, tenon work, drilling, boring, stripping, millwork, and/or any other functions on an object/door can be stored and/or attached to the device 100. Such tools, equipment, accessories and/or materials could include, but are not limited to, mortise drill(s), door hinge template(s), router(s), hinge(s), hammer(s), screwdriver(s), screw(s), nail(s), bolt(s), nut(s), flush bolt(s), and the like.

The embodiment shown in FIGS. 1-5 includes a first upper wheel 118 and a second upper wheel 119 both mounted to the frame 112. The upper wheels 118/119 can be located at or near the distal end of the second side 162 of the frame 112. However, according to some embodiments, the upper wheels can be located at any point along the second side 62 of the frame 112. While the first and second upper wheels 118/119 in the embodiment of FIGS. 1-5 are each 4-inch casters and/or swivel wheels, any suitable size wheel and any suitable style/type of wheel could be used. As will be discussed below, the first and second upper wheels 118/119 are transportation wheels that aid in moving the device 100 and any object(s) that the device 100 is carrying. According to some embodiments, the first and second upper wheels 118/119 are identical mirrors of each other. Additionally, according to some embodiments, any suitable number of upper wheels 118/119 could be included.

The embodiment shown in FIGS. 1-5 includes a fulcrum frame 120, an adjustable member 122 associated with the fulcrum frame 120, two fulcrum blocks 140, and a fulcrum bar 141 connecting the two fulcrum blocks 140 wherein the fulcrum frame 120 is mounted on the fulcrum bar 141. The fulcrum frame 120, fulcrum blocks 140, and adjustable member 122 can be mounted on the carrying arm 117 wherein the fulcrum blocks are also operatively connected to the frame 112. The fulcrum frame 120, its adjustable member 122, the fulcrum blocks 140, and the fulcrum bar 141 provide a means by which the height, alignment, angle, and/or position of the carrying arm 117, and thereby any object supported by the carrying arm 117, can be adjusted. For example, a user can twist the adjustable member 122 to alter the height, alignment, angle, and/or position of the carrying arm 117. Each of the fulcrum blocks 140 can be in slidable contact with opposite sides of the frame 112 such that the height of the carrying arm 117 can be adjusted by sliding the fulcrum blocks 140. For example, according to some embodiments, twisting of the adjustable member 122 can cause the fulcrum frame 120, fulcrum blocks 140, and/or fulcrum bar 141 to loosen and/or tighten. Thereby, when the fulcrum frame 120, fulcrum blocks 140, and/or fulcrum bar 141 are in a loosened state, the fulcrum blocks 140 can be slid up the frame 112 or slid down the frame 112, via the fulcrum frame 120, thereby causing the height of the carrying arm 117, and thereby any object supported by the carrying arm 117, to adjust accordingly. Additionally, when the fulcrum frame 120, fulcrum blocks 140, and/or fulcrum bar 141 are in a loosened state the horizontal position of the carrying arm 117 can be adjusted. Further, when the fulcrum frame 120, fulcrum blocks 140, and/or fulcrum bar 141 are in a loosened state the carrying arm 117 can be tilted in at least two different planes (at least a generally vertical plane and generally horizontal plane) so that its angle, and thereby the angle of any object supported by the carrying arm 117, is adjusted. The adjustable member 122 can then be twisted the opposite direction to tighten the fulcrum frame 120, fulcrum blocks 140, and/or fulcrum bar 141 such that they are locked in place, thereby locking the carrying arm 117, and any object thereon, in place. According to some embodiments, the adjustable member 122 can be a ratchet rod, however any suitable member could be used such as a wheel, lever, and the like. According to some embodiments, the fulcrum frame 120, adjustable member 122, the two fulcrum blocks 140, and the fulcrum bar 141 can be used in combination to adjust the height, alignment, angle, and/or position (vertical and/or horizontal) of the carrying arm 117, and thereby any object being supported by the carrying arm 117.

The embodiment shown in FIGS. 1-5 includes a side adjustment rod 124 mounted on the frame via an adjustment plate 125 wherein the side adjustment rod 124 is in operable communication and/or contact with at least a portion of the carrying arm 117. In addition to the fulcrum frame 120, adjustable member 122, the two fulcrum blocks 140, and the fulcrum bar 141, the side adjustment rod 124 is another component of the device 100 that can be used to adjust the height, alignment, angle, and/or position (vertical and/or horizontal) of the carrying arm 117. The side adjustment rod 124 can move in a horizontal direction in and/or on the adjustment plate 125. The side adjustment rod 124 can further be in contact with at least a portion of the carrying arm 117 such that when the side adjustment rod 124 moves horizontally, the carrying arm 117 is forced to move accordingly. According to some embodiments, the side adjustment rod 124 can be used to adjust the horizontal and/or vertical positioning and/or adjust the angle and/or tilt of the carrying arm 117 such that the carrying arm 117, and thereby any object being supported by the carrying arm 117, can be swung in at least two planes, including at least a generally vertical plane and generally horizontal plane. The side adjustment rod 124 of FIGS. 1-5 is a twistable screw/rod-type member, however any suitable component to adjust the positioning of the carrying arm 117 could be used. The adjustment plate 125 can be mounted to the frame 112 and can be constructed from any suitable material including, but not limited to, metal, wood, plastic, and the like. The adjustment plate 125 can include a generally linear and horizontal aperture through which the adjustment rod 124 can move horizontally.

The embodiment shown in FIGS. 1-5 includes a first large wheel 130, a second large wheel 131, a first attachment plate 128, and a second attachment plate 129. The first and second attachment plates 128/129 can be mounted to the frame 112 wherein the first and second large wheels 130/131 are secured to the frame 112 via the first and second attachment plates 128/129 respectively. The large wheels 130/131 can be located at or near the corner of the frame 112 where the first side 160 and the second side 162 meet. However, according to some embodiments, the large wheels 130/131 can be located at any suitable location. According to some embodiments, the first and second large wheels 130/131 are transportation wheels and can be pneumatic and can include a rubber tire such that they are able to traverse an abundance of terrain and/or surfaces as well as being able to traverse uneven obstacles such as stairs, ramps (including a ramp to load enter a truck), bumps, driveways, outdoor areas at a construction site (which could include concrete, dirt, grass, and the like), and the like. Additionally, the fact that the first and second large wheels 130/131 include pneumatic, rubber tires allows for the device to easily enter and exit an elevator. According to some embodiments, each of the first and second large wheels 130/131 can be a 10-inch wheel. While the first and second large wheels 130/131 are pneumatic, rubber, 10-inch tires according to some embodiments, any suitable style, type, material, and/or size wheel could be used. Additionally, according to some embodiments, any suitable number of large wheels 130/131 could be included.

According to some embodiments, the first and second large wheels 130/131 are identical mirrors of each other. According to some embodiments, the first and second attachment plates 128/129 are identical mirrors of each other.

The embodiment shown in FIGS. 1-5 includes a brake assembly 142 having a brake handle 126 wherein the brake assembly 142 is mounted on or near the second attachment plate 129 and a portion of the brake assembly 142 is, at times, in operable communication and/or contact with the second large wheel 131. While, according to some embodiments, the brake assembly 142 of the embodiment of FIGS. 1-5 is mounted on or near the second attachment plate 129 and a portion of the brake assembly 142 is operably connected to the second large wheel 131, the brake assembly 142 could be mounted on or near the first attachment plate 128 and a portion of said brake assembly 142 be operably connected to the first large wheel 130. Additionally, according to some embodiments, two brake assemblies 142 could be included, wherein one is mounted on or near the first attachment plate 128 and a portion of said brake assembly 142 is operably connected to the first large wheel 130 and the other is mounted on or near the second attachment plate 129 and a portion of that brake assembly is operably connected to the second large wheel 131. The brake assembly 142 and brake handle 126 are configured such that a user can access and/or manipulate the brake handle 126 to cause a portion of the brake assembly 142 to forcibly contact the operably connected large wheel which causes said large wheel to brake, thereby causing the device 100 to brake.

The embodiment shown in FIGS. 1-5 includes a first lower rear wheel assembly 134 and a second lower rear wheel assembly 135 wherein the first lower rear wheel assembly 134 includes a first lower rear wheel 132 and the second lower rear wheel assembly 135 includes a second lower rear wheel 133. The first and second lower rear wheel assemblies 134/135 can be mounted to a portion of the frame 112. The first lower rear wheel assembly 134 (and the first lower rear wheel 132) can be positioned adjacent to the first large wheel 130. The second lower rear wheel assembly 135 (and the second lower rear wheel 133) can be positioned adjacent to the second large wheel 131. According to some embodiments, the first lower rear wheel 132, second lower rear wheel 133, first lower rear wheel assembly 134, and second lower rear wheel assembly 135 can be located at or near the corner of the frame 112 formed where the first side 160 and the second side 162 meet. However, according to some embodiments, the first lower rear wheel 132, second lower rear wheel 133, first lower rear wheel assembly 134, and second lower rear wheel assembly 135 can be located at any suitable location. The first and second lower rear wheel assemblies 134/135 can be spring loaded and can be raised and/or lowered by a user. When the first and second lower rear wheel assemblies 134/135 are lowered such that they engage and/or are in contact with the ground and are in use, they allow for sideways motion of the device 100. The first and second lower rear wheels 132/133 can be casters and/or swivel wheels according to some embodiments, however, any suitable type of wheel could be used. The first and second lower rear wheels 132/133 can be 2-inch, 2.5-inch, and/or any other suitable size. The first and second lower rear wheel assemblies 134/135 can measure 13 inches in length and/or be any other suitable length and/or size. The first lower rear wheel assembly 134 can include a first lower rear lock 156 and the second lower rear wheel assembly 135 can include a second lower rear lock 158. The first lower rear lock 156 can be used to lock the first lower rear wheel assembly 134 in place such that the first lower rear wheel 132 is either locked in the raised position (not in contact with the ground) or in the lowered position (in contact with the ground), whichever is desired. In the same way, the second lower rear lock 158 can be used to lock the second lower rear wheel assembly 135 in place such that the second lower rear wheel 133 is either locked in the raised position (not in contact with the ground) or in the lowered position (in contact with the ground). Additionally, according to some embodiments, any suitable number of lower rear wheels 132/133 and/or lower rear wheel assemblies 134/135 could be included. The lower rear wheels 132/133 are transportation wheels.

According to some embodiments, the first and second lower rear wheel assemblies 134/135 are identical mirrors of each other. According to some embodiments, the first and second lower rear wheels 132/133 are identical mirrors of each other.

The embodiment shown in FIGS. 1-5 includes a carrying arm 117 that comprises a foot member 138. The foot member 138 is configured to receive at least a portion of an object/door. The foot member 138 is detachable/removable such that it can be detached/removed from the carrying arm 117 and/or device 100. For example, the foot member 138 can be removed and/or detached from the carrying arm 117 and/or device 100 in circumstances where there is shallow distance between the floor and the bottom of the object/door secured by the device 100. The foot member 138 can be removed/detached at any time and/or for any reason. The foot member 138 can include a platform and/or pocket wherein the object/door can rest on the foot member 138 such that the foot member 138 at least partially supports the object/door and/or can provide some stability to the object/door. In addition to the fulcrum frame 120, adjustable member 122, the two fulcrum blocks 140, the fulcrum bar 141, the side adjustment rod 124, the adjustment plate 125, and the lower adjustment rod 154, the foot member 138 is another component of the device 100 that can be used to adjust the height, alignment, angle, and/or position (horizontal and/or vertical) of the carrying arm 117. The foot member 138 can facilitate movement of the carrying arm 117 (including an object/door secured in/on the carrying arm 117) such as adjustment of the height, alignment, angle, and/or position (vertical and/or horizontal) of the carrying arm 117 (and thereby the object/door). The foot member 138 can also facilitate tilting/swinging of the carrying arm 117 such that the angle of the carrying arm 117 (and thereby the object/door is adjusted). The foot member is capable of tilting/swinging the carrying arm 117 (and thereby the object/door) in at least two planes, including at least a generally vertical plane and a generally horizontal plane. The foot member 138 can include a protective lining, such as rubber or any other suitable material, wherein an object/door received by the foot member 138 is protected from damage. Thus, the device 100 can be used to secure, store, transport, uninstall, and/or install a finished and/or pre-finished product without fear of damaging said product.

The embodiment shown in FIGS. 1-5 includes a lower adjustment rod 154 that is mounted to the frame 112 and is in operable communication and/or contact with at least a portion of the carrying arm 117 and/or the object/door secured by the carrying arm 117. In addition to the fulcrum frame 120, adjustable member 122, the two fulcrum blocks 140, the fulcrum bar 141, the side adjustment rod 124, the adjustment plate 125, and the foot member 138, the lower adjustment rod 154 is another component of the device 100 that can be used to adjust the height, alignment, angle, and/or position (horizontal and/or vertical) of the carrying arm 117. According to some embodiments, the lower adjustment rod 154 is a twistable rod/screw-like element that can extend and/or retract to move the carrying arm 117 and/or the object/door. The lower adjustment rod 154 can be extended and/or retracted in a horizontal direction. The lower adjustment rod 154 can further be in contact with at least a portion of the carrying arm 117 such that when the lower adjustment rod 154 extends and/or retracts, the carrying arm 117 is forced to move accordingly. According to some embodiments, the lower adjustment rod 154 can be used to adjust the horizontal positioning and/or the angle of the carrying arm 117, and thereby any object/door being supported by the carrying arm 117. In this way, the carrying arm 117 and/or object/door can be tilted and/or swung in at least two planes, including at least a generally vertical plane and a generally horizontal plane. While the lower adjustment rod 154 of the embodiment of FIGS. 1-5 is a twistable screw/rod-type member, any suitable component that could be used to adjust the positioning of the carrying arm 117 could be included.

The embodiment shown in FIGS. 1-5 includes a first adjustable leg 146 and a second adjustable leg 147 extending from the first side 160 of the frame 112. The adjustable legs 146/147 can extend at a perpendicular angle from the carrying arm 117 and the second side 162 of the frame 112 such that the frame 112 and/or device 100 generally takes the shape of the capital letter "L". The adjustable legs 146/147 provide the ability for the device to be used with different size objects/doors. Hence, the adjustable legs 146/147 can be extended when receiving a large object/door and can be retracted when receiving a smaller object/door. According to some embodiments, the device 100 is capable of lifting, securing, holding, transporting, uninstalling, and/or installing large objects/doors. For example, the device 100 is capable of lifting, securing, holding, transporting, uninstalling, and/or installing a door with dimensions up to 8 feet×4 feet×2 inches. Each of the adjustable legs 146/147 can be slidably connected to a protrusion of the first side 160 of the frame 112 wherein each protrusion includes at least one hole and/or aperture. Each of the adjustable legs 146/147 can include a plurality of holes and/or apertures wherein one of the holes/apertures of each of the adjustable legs 146/147 can be aligned with the hole/aperture on one of the protrusions of the frame 112 so that the adjustable legs 146/147 achieve a desired length. A first holding pin 144 can be used to lock the first adjustable leg 146 at a desired length by extending the first holding pin 144 through a hole/aperture of the first adjustable leg 146 and a hole/aperture of one of the protrusions of the frame 112. In the same way, a second holding pin 145 can be used to lock the second adjustable leg 147 at a desired length by extending the second holding pin 145 through a hole/aperture of the second adjustable leg 147 and a hole/aperture of the other protrusion of the frame 112.

According to some embodiments, the first and second adjustable legs 146/147 are identical mirrors of each other. According to some embodiments, the first and second holding pins 144/145 are identical mirrors of each other.

Figure 2:
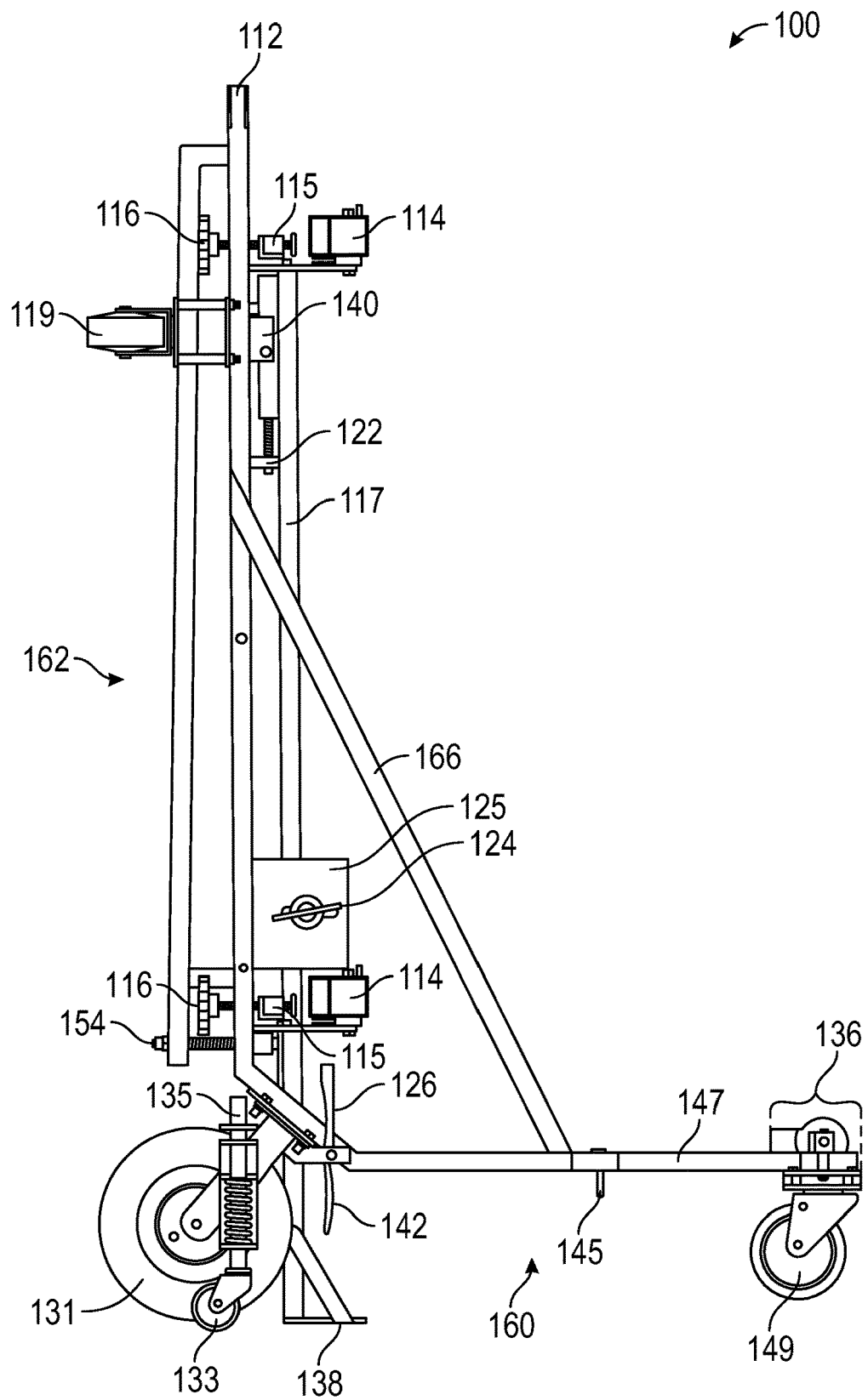
FIG. 2 shows a side elevation view of the jack and dolly device of FIG. 1 in a vertical position.
Figure 3:
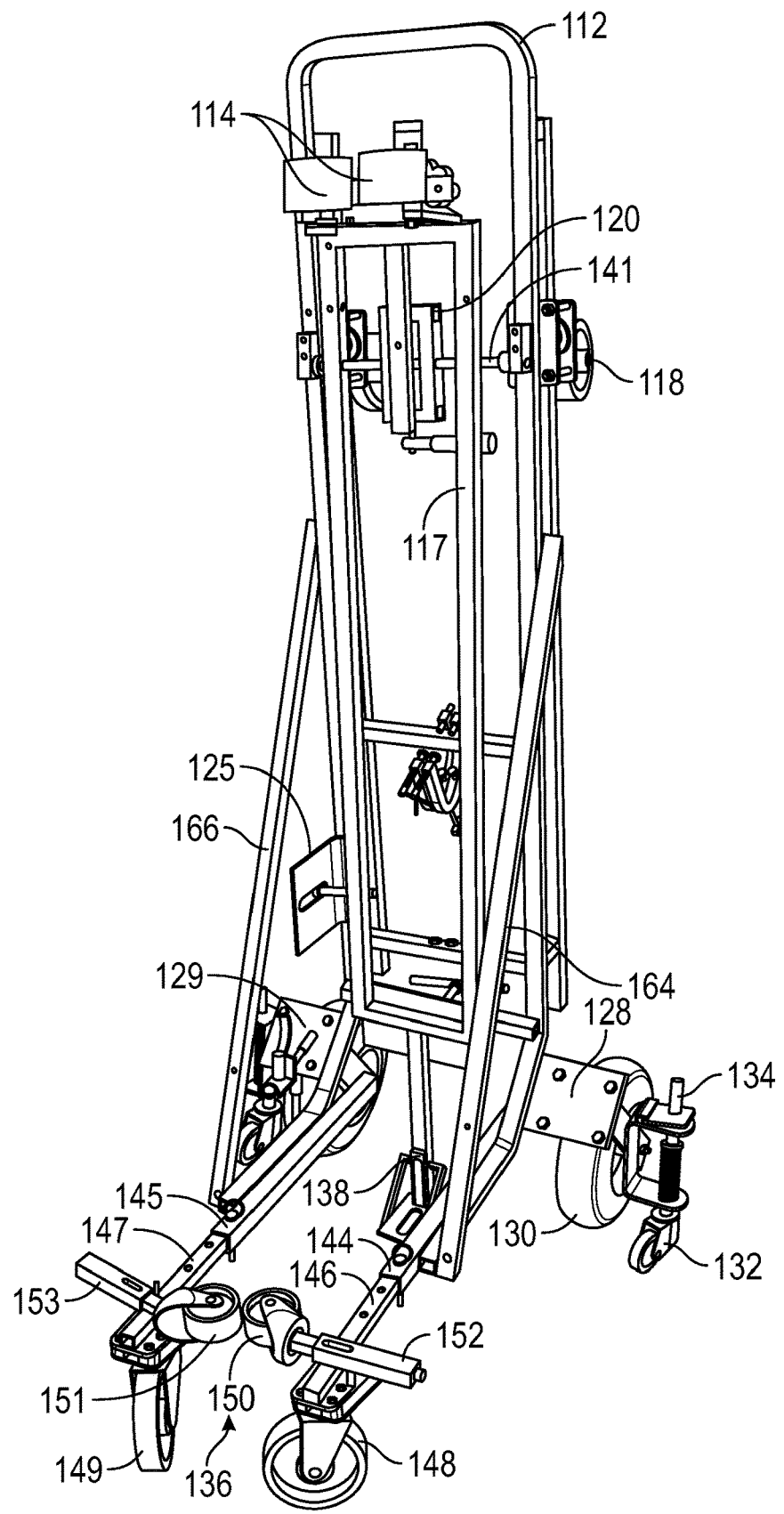
FIG. 3 shows a perspective view of the jack and dolly device of FIGS. 1 and 2 in a vertical position.
Figure 4:
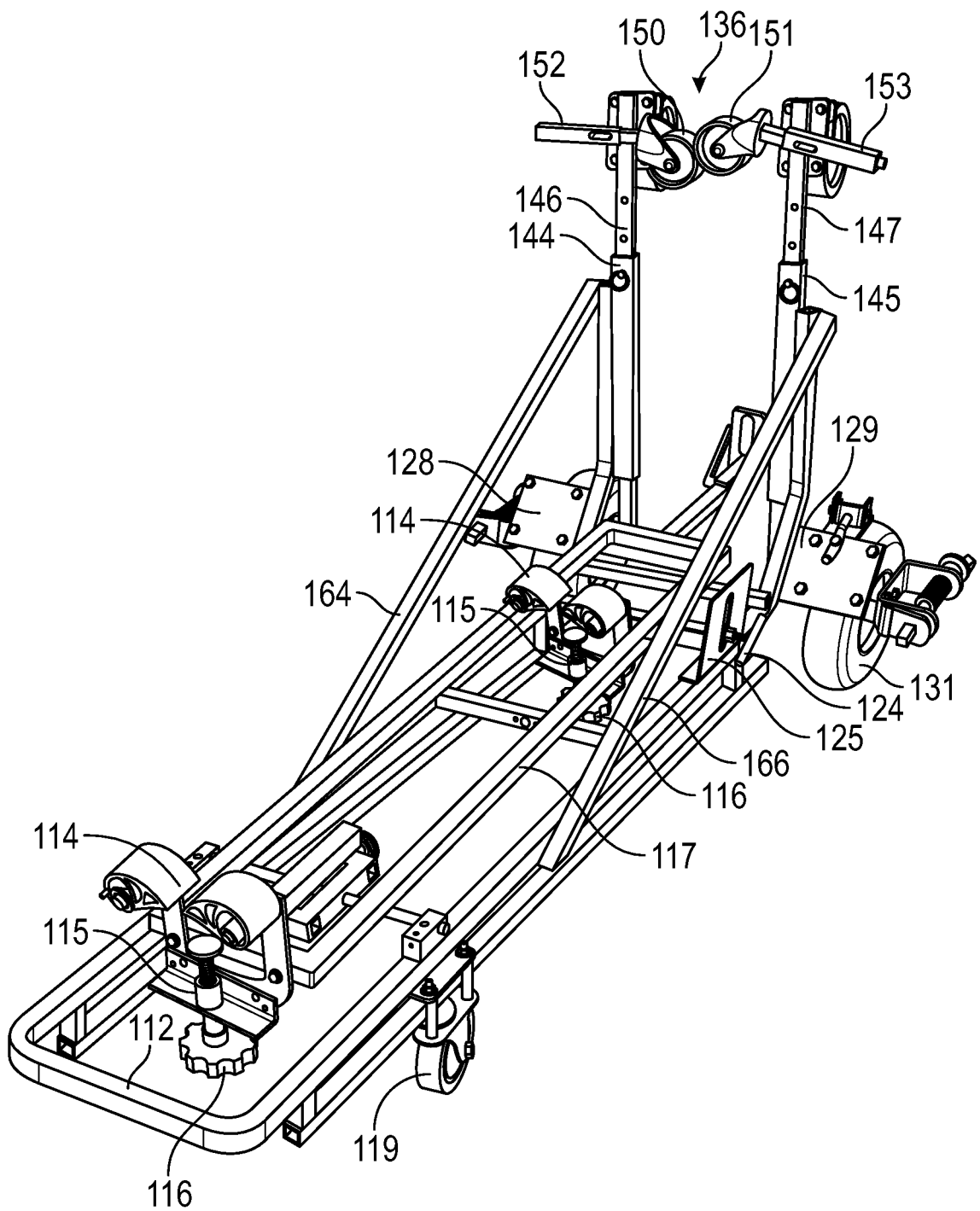
FIG. 4 shows a perspective view of the jack and dolly device of FIGS. 1-3 in a horizontal position.
Figure 5:
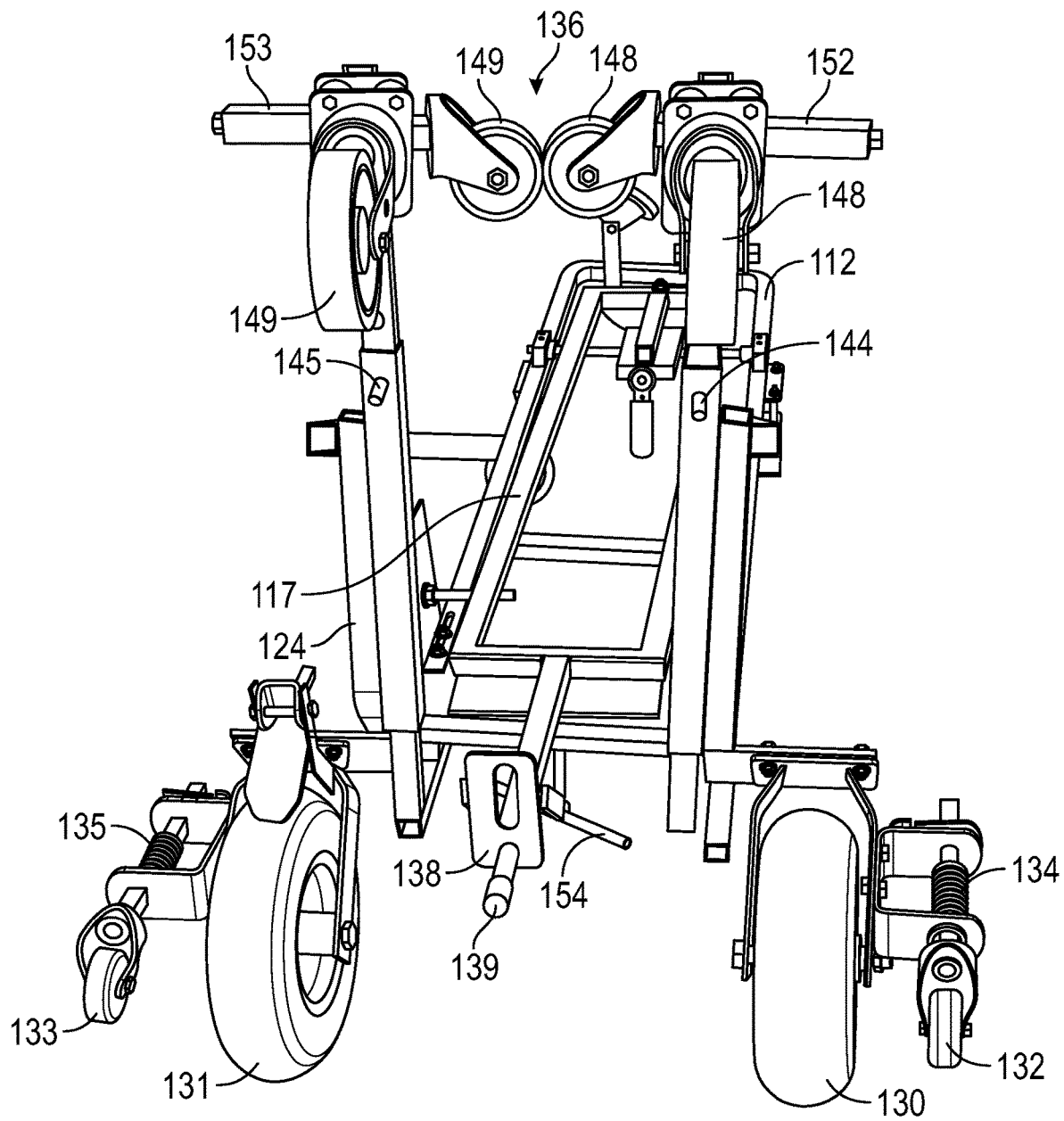
FIG. 5 shows a bottom elevation view of the jack and dolly device of FIGS. 1-4 in a horizontal position.

The embodiment shown in FIGS. 1-5 includes a first front wheel 148 and a second front wheel 149, each mounted to the distal end of one of the adjustable legs 146/147. According to some embodiments, each of the front wheels 148/149 are 5-inch casters and/or swivel wheels, however, any suitable style, type, and/or size of wheel could be used. The front wheels 148/149 are transportation wheels and can be located at or near the distal end of the first side 160 of the frame 112. However, according to some embodiments, the upper wheels 148/149 can be located at any point along the first side 160 of the frame 112. The device 100 is configured such that it can stand and/or be transported in a vertical position and/or in a horizontal position. The device 100 can stand and/or be transported in a vertical position wherein the first side 160 of the frame 112 is parallel with the ground and the first and second front wheels 148/149 and the large wheels 130/131 (and in some instances the first and second lower rear wheels 132/133) are in contact with the ground and provide support and/or movement for the device 100. The vertical position is shown in FIGS. 1-3. The device 100 can also stand and/or be transported in a horizontal position wherein the second side 162 of the frame 112 is parallel with the ground and the first and second upper wheels 118/119 and the large wheels 130/131 are in contact with the ground and provide support and/or movement for the device 100. The horizontal position is shown in FIGS. 4 and 5. Being able to stand and/or be transported (and thereby transport an object/door) in a vertical or horizontal position renders the device 100 to be highly versatile and easily transportable in many different situations. For example, being able to travel vertically or horizontally, combined with the use of the large wheels 130/131, allows the device 100, and objects/doors that the device 100 is carrying, to easily enter and exit an elevator, to easily maneuver in tight spaces, and to easily maneuver across different terrain and situations including but not limited to, hallways, doorways, tunnels, stairs, ramps (including a ramp used to enter a truck), driveways, outdoor areas, dirt, grass, construction site areas, and the like. Additionally, according to some embodiments, any suitable number of front wheels 148/149 could be included.

According to some embodiments, the first and second front wheels 148/149 are identical mirrors of each other.

The embodiment shown in FIGS. 1-5 includes a lower securing assembly 136 that comprises a first lower securing wheel 150, a second lower securing wheel 151, a first stabilizing arm 152, and a second stabilizing arm 153. The first stabilizing arm 152 can be mounted on a distal end of the first adjustable leg 146. The second stabilizing arm 153 can be mounted on a distal end of the second adjustable leg 147. The first securing wheel 150 can be mounted on the first stabilizing arm 152 and the second securing wheel 151 can be mounted on the second stabilizing arm 153. The first and second lower securing wheels 150/151 can extend toward each other such that they are opposing surfaces wherein an object/door could be inserted between the first and second lower securing wheels 150/151. The first and second lower securing wheels 150/151 are configured to work in combination to receive at least a portion of an object/door. The first and second lower securing wheels 150/151 and the securing mechanism 114 can simultaneously receive, secure, and/or hold an object/door wherein the first and second lower securing wheels 150/151 receive, secure, and/or hold one end of the object/door and the securing mechanism 114 receives, secures, and/or holds the other end of the object/door. According to some embodiments, the first and second lower securing wheels 150/151 can be 2.75-inch swivel wheels. While the lower securing assembly 136 of FIGS. 1-5 includes two wheels as opposing surfaces, any suitable apparatus or method of securing an object/door could be used. For example, different styles, types, and/or sizes of wheels could be used. Any opposing surfaces, regardless of whether they are wheels, could be used. For instance, holding cams similar to the securing mechanism 114 of the embodiment of FIGS. 1-5 could be used. Further, any type of suitable securing mechanism, regardless of opposing surfaces could be used. Additionally, according to some embodiments, the lower securing wheels 150/151 can include a protective lining, such as rubber or any other suitable material wherein an object/door received by the lower securing wheels 150/151 is not damaged. Thus, the device 100 can be used to secure, store, transport, uninstall, and/or install a finished product without fear of damaging said product. The stabilizing arms 152/153 can be 10 inches in length and can be spring loaded. However, according to the some embodiments, the stabilizing arms 152/153 can be of any length, size, and/or nature.

According to some embodiments, the first and second lower securing wheels 150/151 are identical mirrors of each other. According to some embodiments, the first and second stabilizing arms 152/153 are identical mirrors of each other.

Figure 6:
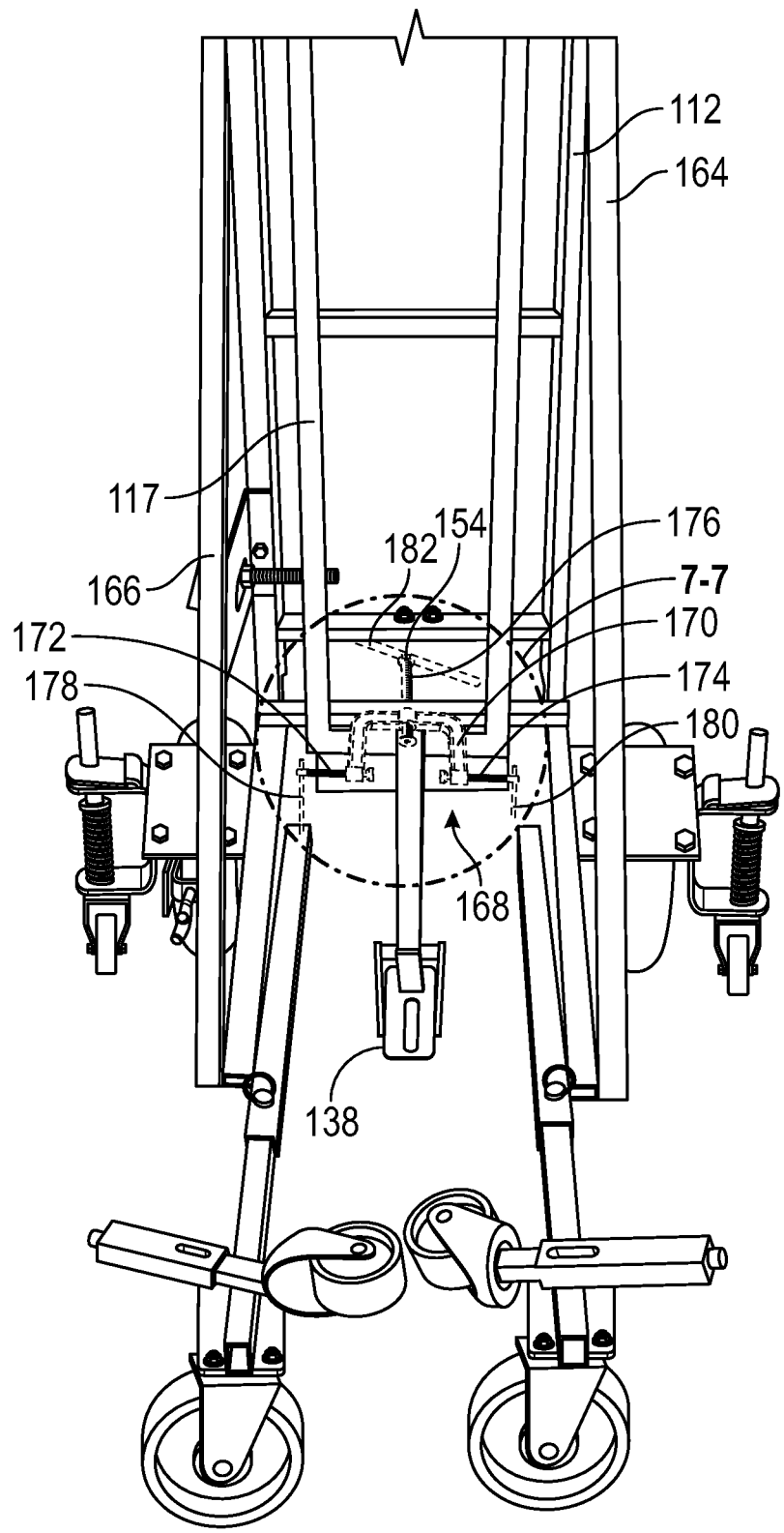
FIG. 6 shows a partial front view of the jack and dolly device of FIGS. 1-5 further comprising a clamp.
Figure 7:
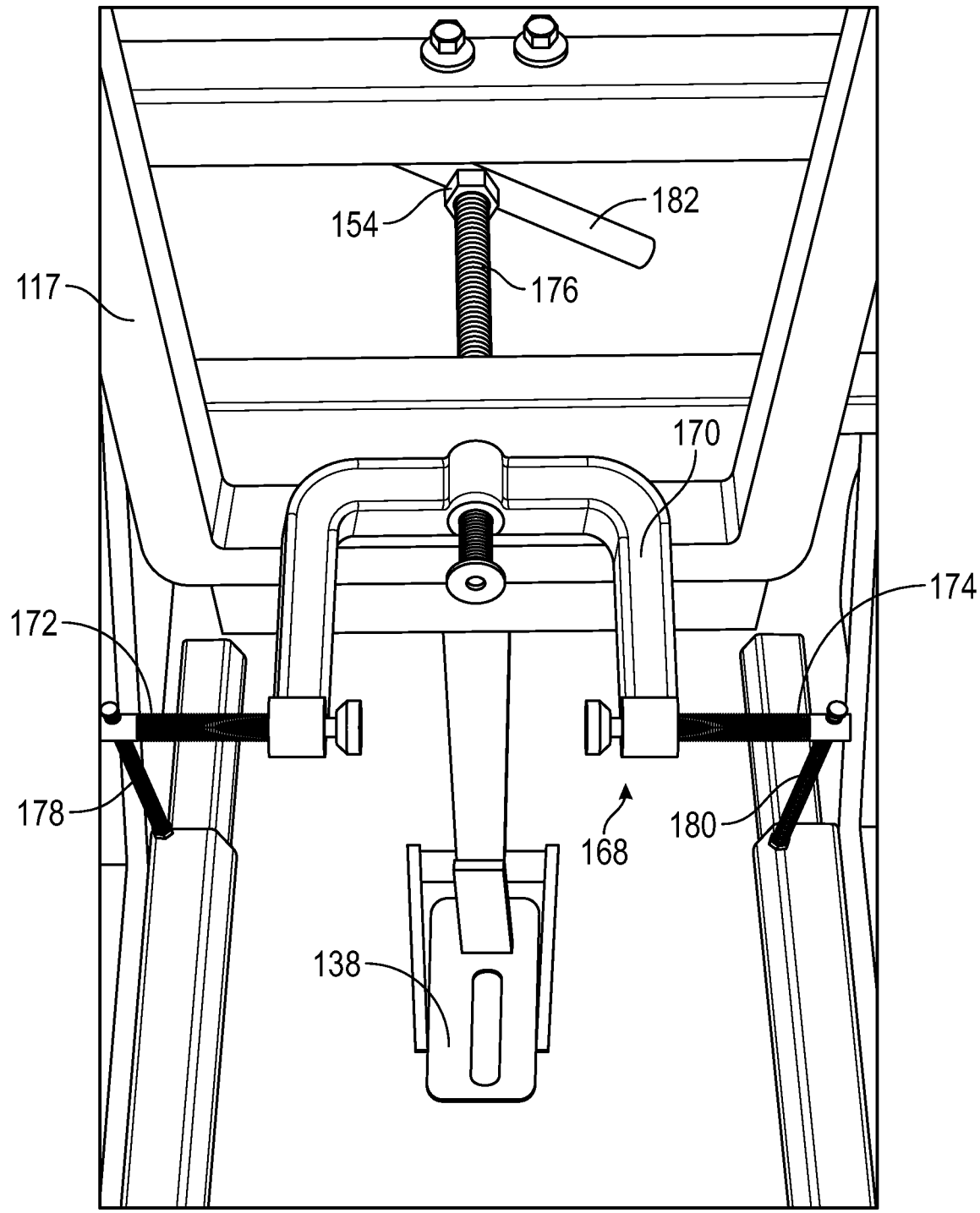
FIG. 7 shows a top, front elevation view of the clamp of FIG. 6 employed by the jack and dolly device of FIGS. 1-5.
Figure 8:
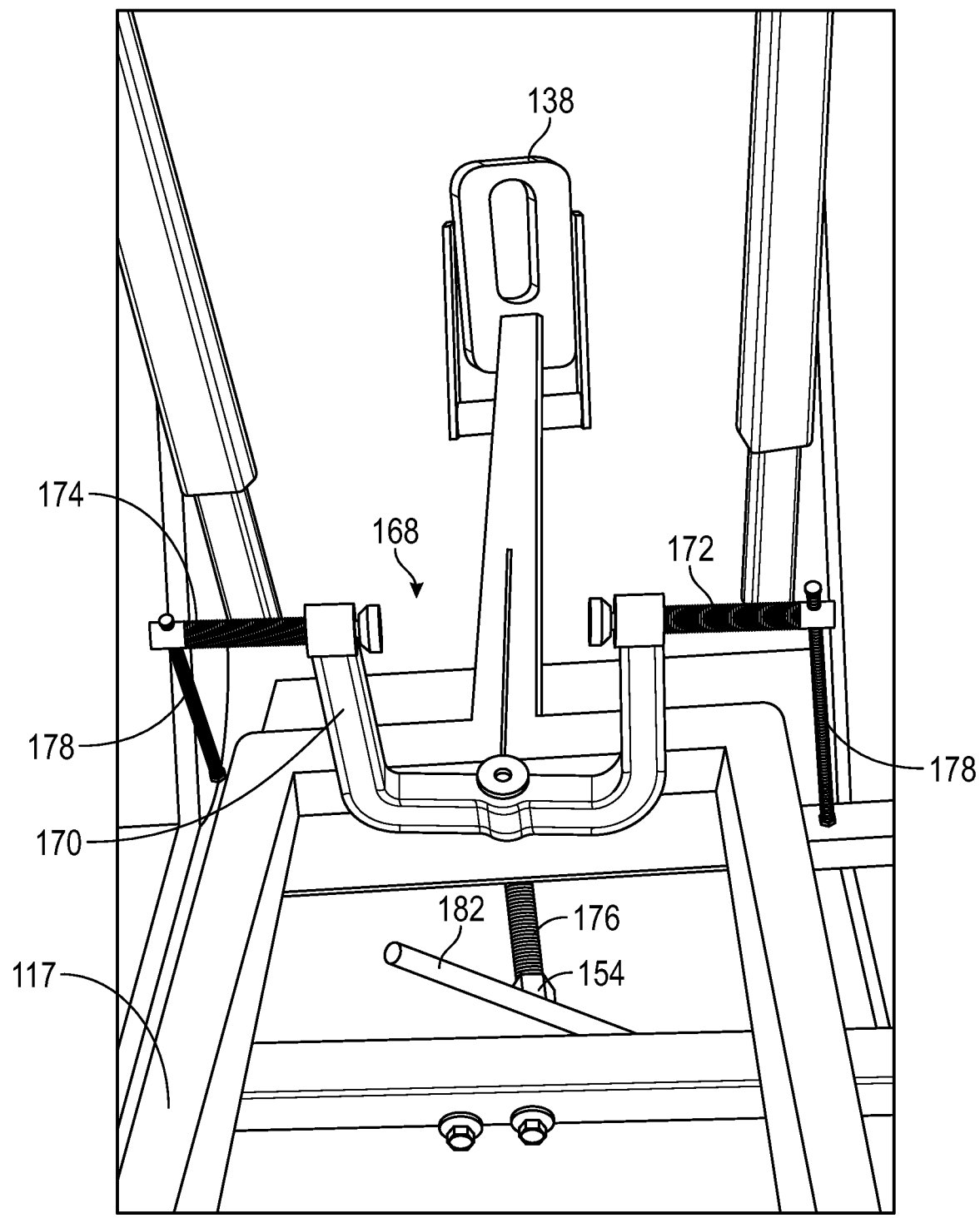
FIG. 8 shows a top, rear elevation view of the clamp of FIGS. 6 and 7 employed by the jack and dolly device of FIGS. 1-5.

As shown in FIGS. 6-8, the device 100 optionally includes a clamp 168. The clamp 168, according to some embodiments, comprises a clamp body 170, a first clamp leg 172, a second clamp leg 174, a third clamp leg 176, a first clamp lever 178, a second clamp lever 180, and a third clamp lever 182. Each of the first, second, and third clamp legs 172/174/176 can include an end member that contacts an object/door to be secured and/or held in place. The clamp 168 is configured to receive at least a portion of an object/door via any combination of its first, second, and/or third legs 172/174/176. Thus, the clamp 168 is configured to squeeze, secure, hold in place, move, align, adjust, and/or position an object/door, which can be at least partially held by the carrying arm 117 and/or device 100. The securing mechanism can simultaneously receive at least a portion of the object/door. The end member of each of the first, second, and third clamp legs 172/174/176 can include a protective lining such as rubber or any other suitable material. Thus, there is no risk of any object/door suffering any damage by using the device 100 to lift, hold, store, transport, uninstall, and/or install said object/door. Therefore, the device 100 can be used to lift, hold, store, transport, uninstall, and/or install any object/door without fear that said object/door will suffer any sort of damage.

The clamp 168 and/or clamp body 170 can be a C-clamp and/or any other suitable type of clamp and/or component capable of securing and/or holding an object/door. For example, the clamp 168 could be a clam-type clamp and/or could be similar to the securing mechanism 114. The clamp 168 shown in FIGS. 6-8 includes a C-shaped clamp body 170. The first and second clamp legs 172/174 can be positioned on each end of the clamp body 170 and can be parallel and opposing, such that the two clamp legs 172/174 can be rotated to extend toward each other to squeeze, secure, and/or hold in place an object/door between them. The first and second clamp legs 172/174 can also be rotated to move away from each other such that an object can be unsecured and/or moved as well as inserted and/or removed into/from the clamp 168. The first clamp leg 172 can be rotated via a first clamp lever 178 wherein rotation of the first clamp lever 178 can move the first clamp leg 172 in two different directions along a single plane. The second clamp leg 174 can be rotated via a second clamp lever 180 wherein rotation of the second clamp lever 180 can move the second clamp leg 174 in two different directions along a single plane.

Figure 9:
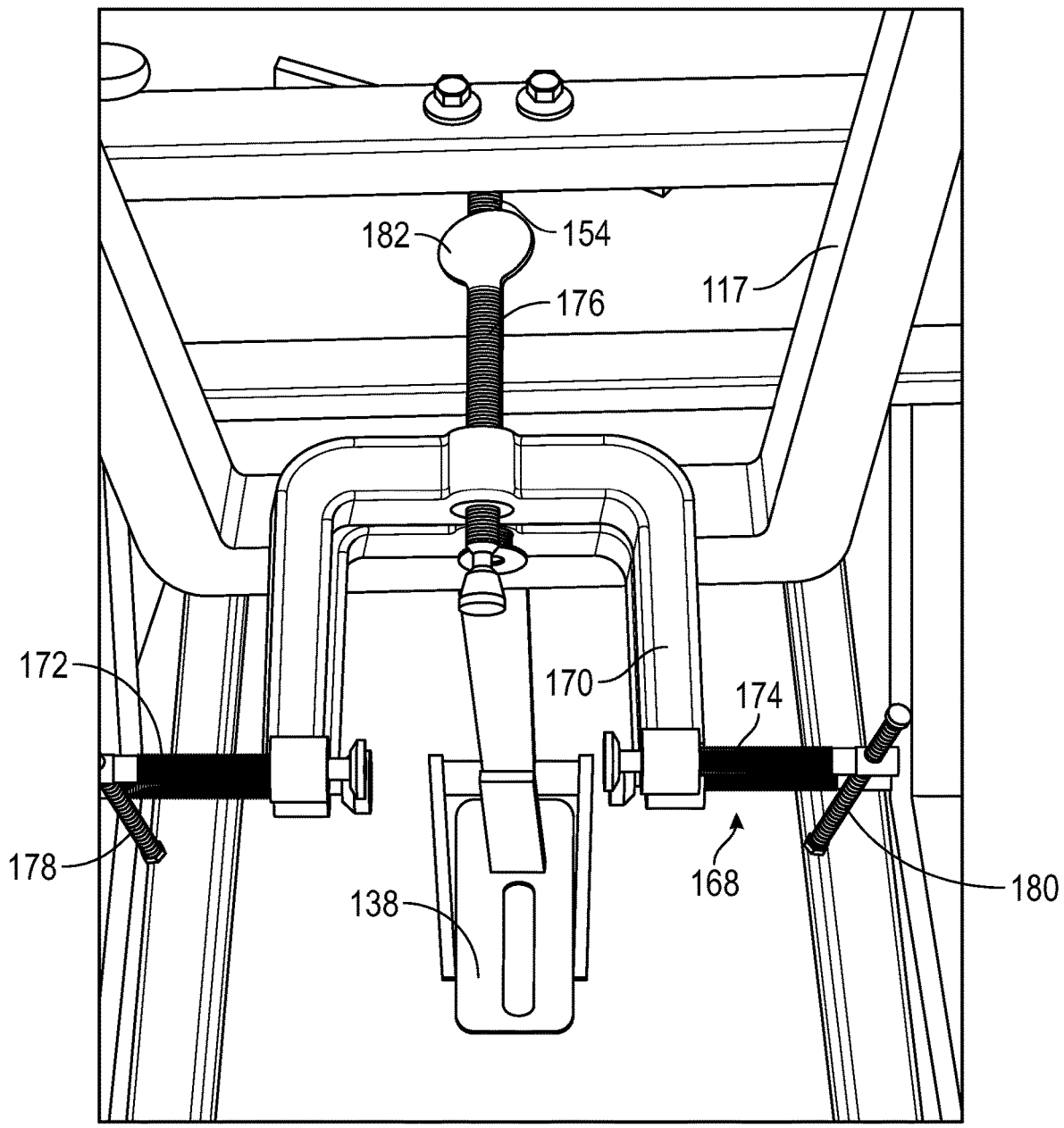
FIG. 9 shows a top, front elevation view of a clamp employed by the jack and dolly device of FIGS. 1-5.

In FIGS. 6-8, the clamp 168 is shown to include a third clamp leg 176 and a third clamp lever 182. The third clamp leg 176 can be rotated via a third clamp lever 182 wherein rotation of the third clamp lever 182 can move the third clamp leg 176 in two different directions along a single plane. As shown in FIGS. 6-8, the third clamp leg 176 can be movable in a plane perpendicular to that of the first and second clamp legs 172/174. The third clamp leg 176 can be rotated such that it extends toward the meeting point of the first and second clamp legs 172/174. Thus, the first, second, and third clamp legs 172/174/176 can extend such that all three meet at a point and/or wherein all three can squeeze, secure, and/or hold an object/door in place. Additionally, according to some embodiments, the third clamp leg 176 and third clamp lever 182 can be one and the same element as the lower adjustment rod 154. According to some embodiments, as shown in FIG. 9, the third clamp leg 176 and third clamp lever 182 can be different than the lower adjustment rod 154.

According to some embodiments, the clamp 168 is removable/detachable from the device 100. According to some embodiments, the clamp 168 is adjustable such that it can be slid up and/or down the carrying arm 117 and/or device 100 to adjust the vertical position of the clamp 168. The horizontal position of the clamp 168 can also be adjustable. The clamp 168 can also be tilted such that the plane upon which it secures an object/door can be adjusted. Additionally, according to some embodiments, in circumstances when the foot member 138 is removed, the clamp 168 can be helpful in securing a bottom portion of an object/door.

According to some embodiments, all elements of the device 100 that could potentially contact at least a portion of an object/door that is being lifted, held, stored, transported, uninstalled, and/or installed using the device 100 can include a protective lining such as rubber or any other suitable material. Thus, there is no risk of any object/door suffering any damage by using the device 100 to lift, hold, store, transport, uninstall, and/or install said object/door. Therefore, the device 100 can be used to lift, hold, store, transport, uninstall, and/or install any object/door without fear that said object/door will suffer any sort of damage.

Therefore, as understood from the present disclosure, the jack and dolly device disclosed herein provides increased efficiency and productivity in storage, transportation, uninstallation, and installation of heavy objects such as a door. This increase in efficiency and productivity stems, at least in part, from the jack and dolly device providing the ability for a single person to easily load, lift, store, install hardware upon, transport, uninstall, position, and/or install a heavy object without the need for help from additional people. The increase in efficiency and productivity also stems, at least in part, from the fact that the device can hold an object, such as a door, in place during the installation process and/or during any kind of machining performed on the object. The device further allows for easy transportation of objects over many types of terrain and other situations such as outdoor areas (dirt, grass, concrete, and the like), tight hallways, elevators, driveways, stairs, ramps, and the like. The device also provides for easy maneuverability across these same types of different terrain and situations. The device also provides the ability to store, transport, uninstall, and/or install an object without damaging the object. Thus, the device allows for use with finished products without fear of said products suffering any damage. The device also eliminates and/or reduces the likelihood and/or number of injuries in that use of the device eliminates and/or reduces heavy lifting to be performed by a user. The device is also durable and fire resistant. The device is also capable of lifting, holding, securing, storing, transporting, uninstalling, and/or installing heavy objects/doors. The device is also capable of functioning as a work station wherein the device can act as a clamp to securely hold an object/door so that a user can perform actions on the object/door.

Figure 10:
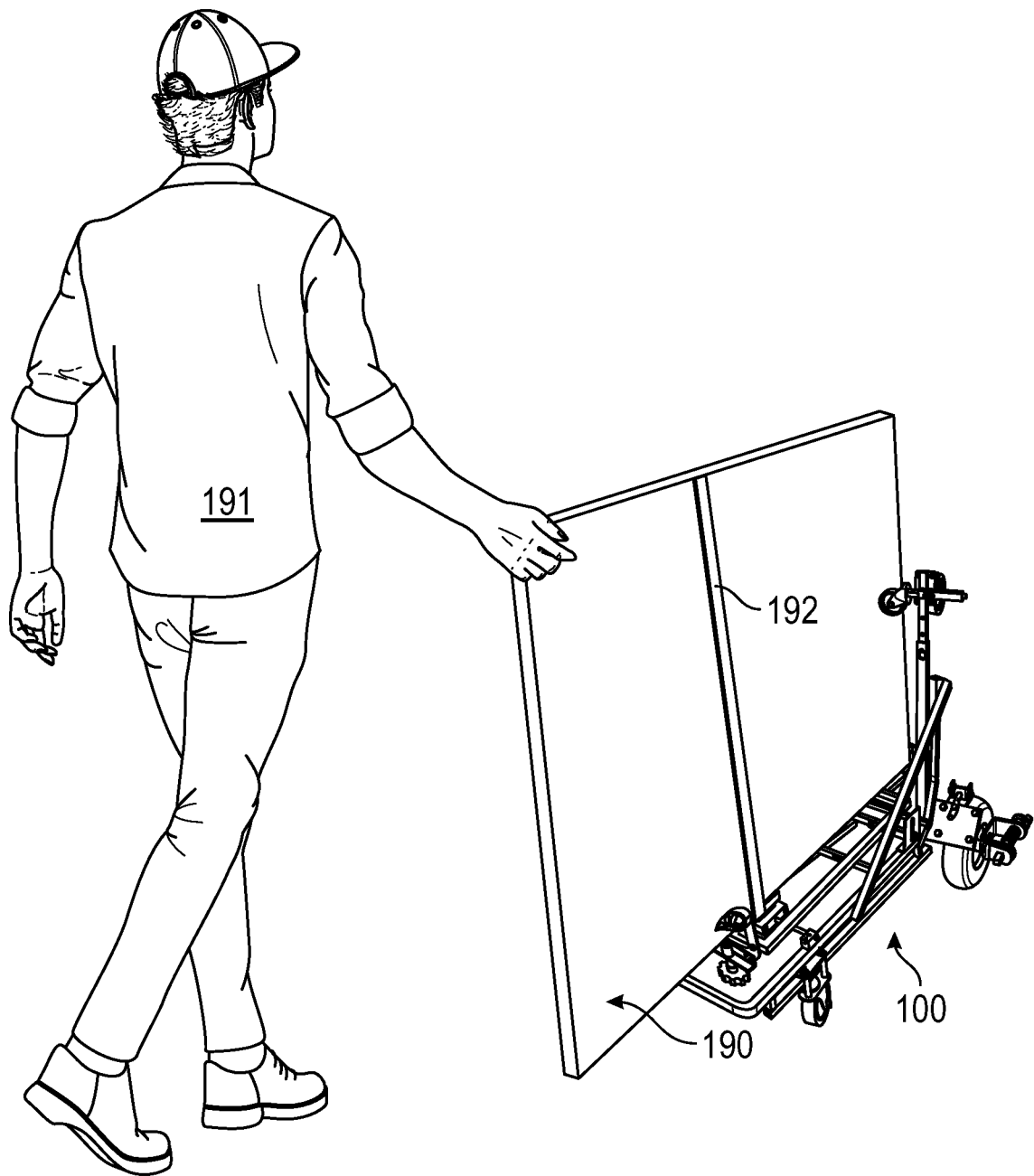
FIG. 10 shows a reference view of the jack and dolly device of FIGS. 1-5 hauling a heavy door.
Figure 11:
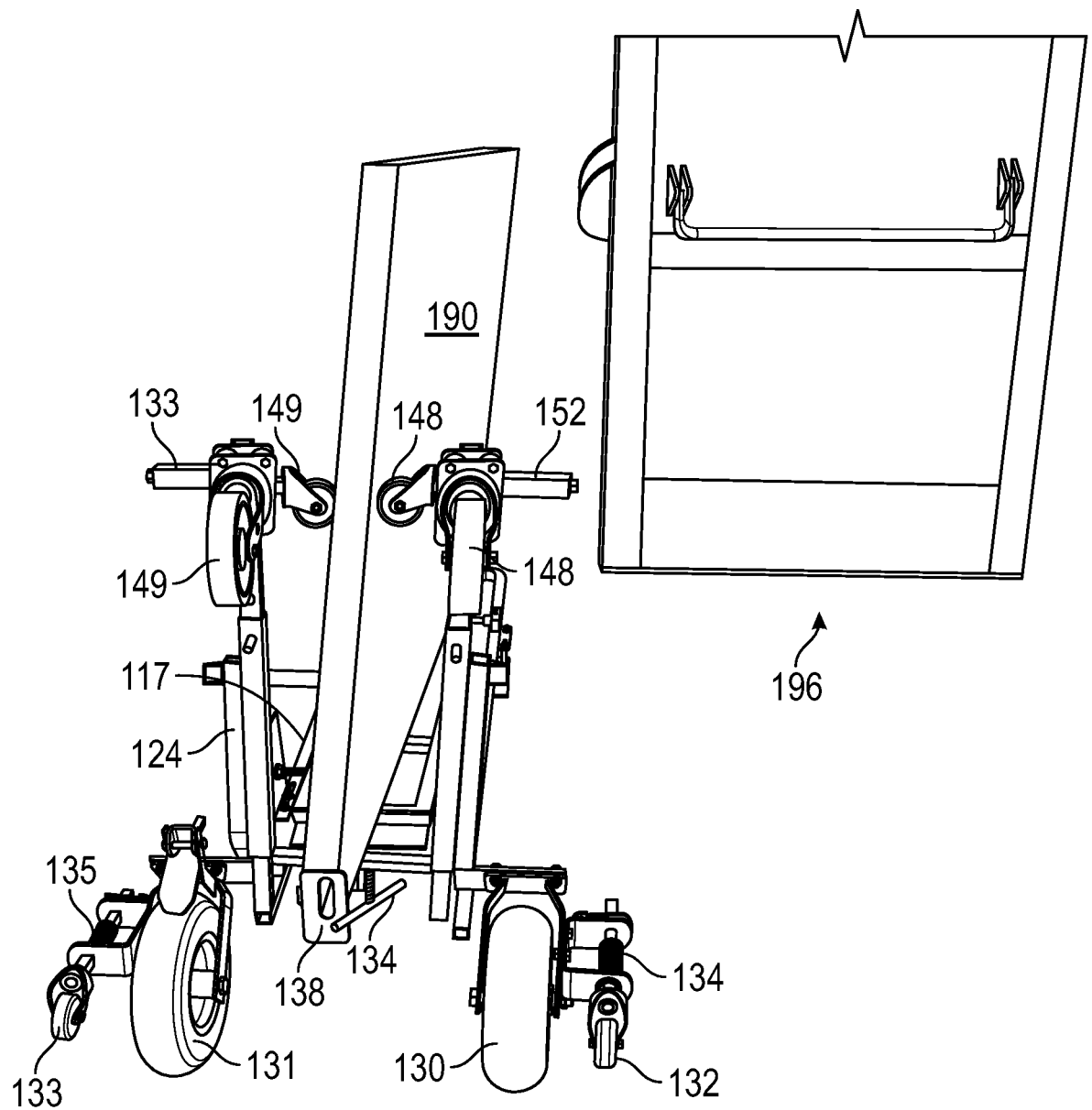
FIG. 11 shows a reference view of the jack and dolly device of FIGS. 1-5 hauling a heavy door through a left-hand door of a school hallway, the right-hand door being shut.

The jack and dolly device 100 of FIGS. 1-9 is shown in an operating position in FIGS. 10-11. In particular, an operator 191 secures a heavy door 190 to the jack and dolly device 100 using at least one strap 192, as shown in FIG. 10. The heavy door 190 is secured in an upright position between the front wheels 148, 149 and is transported while the jack and dolly device 100 is in a horizontal position, as shown in FIG. 11. This allows the heavy door to fit between other narrow openings, e.g., through a left-side door of double doors commonly found in American schools. As shown in FIG. 11, the right-side door 196 can remain shut while the heavy door 190 being transported moves through only the left-side door opening.

Figure 12:
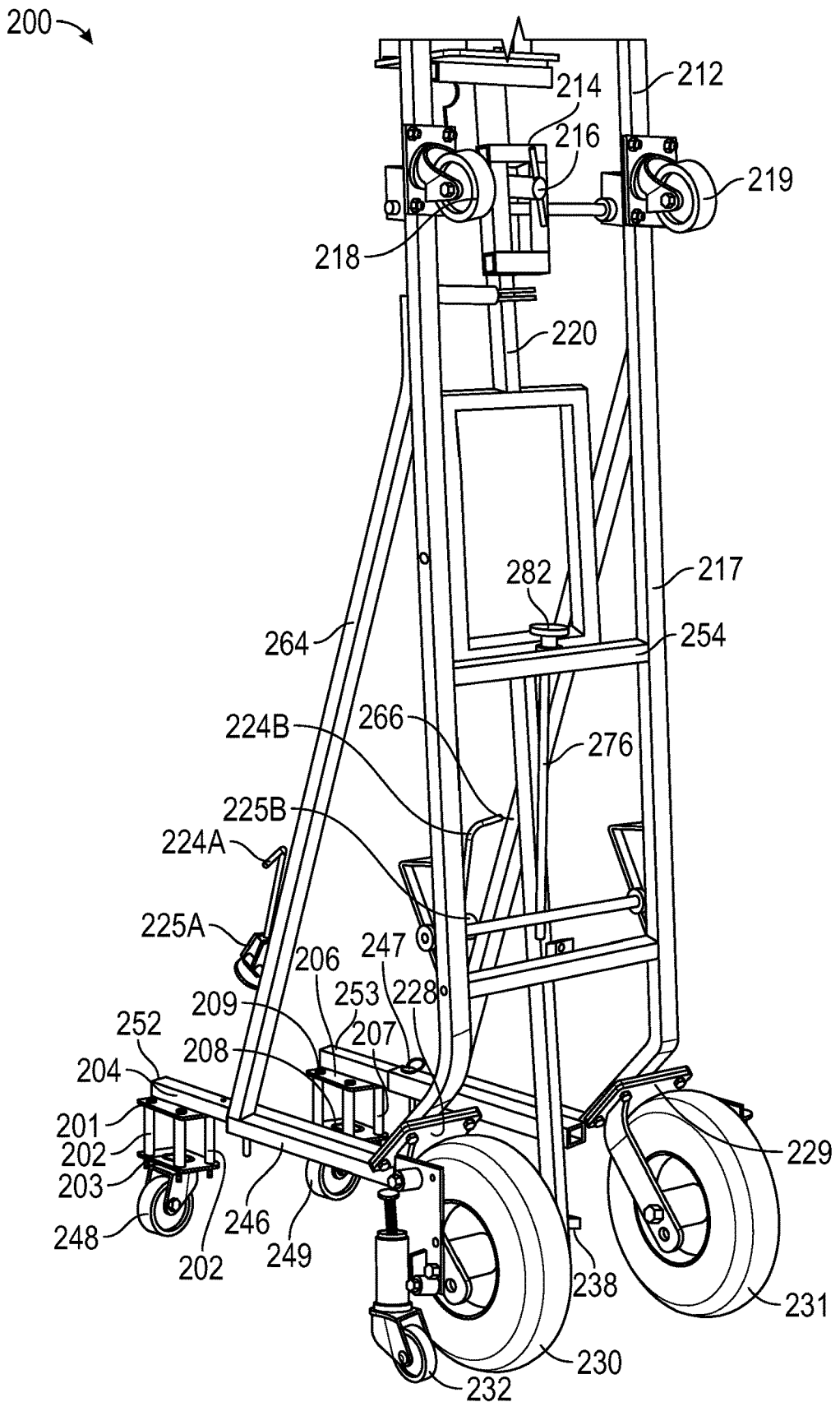
FIG. 12 shows a perspective view of another jack and dolly device in a vertical position, emphasizing that the jack and dolly device can be used with different wheel mounts and different sized wheels.
Figure 13:
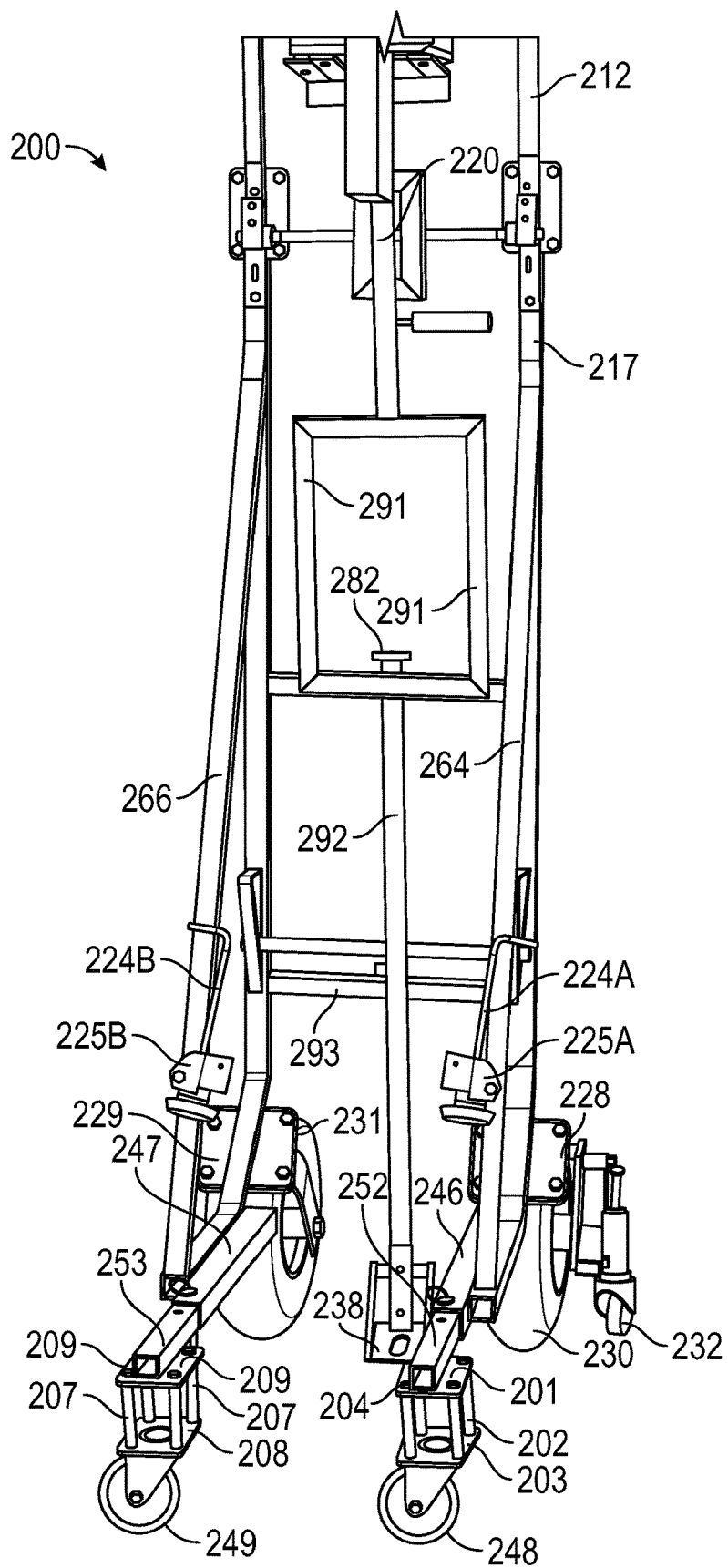
FIG. 13 shows another perspective view of the jack and dolly device of FIG. 12.

Another embodiment of a jack and dolly device 200 is shown in FIGS. 12-13. It is to be appreciated that the jack and dolly device 200 can include any one or more components or any combination of components of the jack and dolly device 100 as described above.

For example, the embodiment of FIGS. 12-13 explicitly shows, at least: a frame 212, securing mechanism 214, knob 216, carrying arm 217, first upper wheel 218, second upper wheel 219, fulcrum frame 220, adjustable member 222 (associated with fulcrum), at least one side adjustment rod 224A, 224B, at least one adjustment plate 225A, 225B, first attachment plate 228, second attachment plate 229, a first large wheel 230, a second large wheel 231, first lower rear wheel 232, a foot member 238, a fulcrum block 240, a fulcrum bar 241, a first adjustable leg 246, a second adjustable leg 247, a first front wheel 248, a second front wheel 249, a first stabilizing arm 252, a second stabilizing arm 253, a lower adjustment rod 254, a first diagonal bar 264, a second diagonal bar 266, at least one clamp leg 276, and at least one clamp lever 282, which correspond and accomplish similar functions as the frame 112, securing mechanism 114, knob 116, carrying arm 117, first upper wheel 118, second upper wheel 119, fulcrum frame 120, adjustable member 122 (associated with fulcrum), side adjustment rod 124, adjustment plate 125, first attachment plate 128, second attachment plate 129, a first large wheel 130, a second large wheel 131, first lower rear wheel 132, a foot member 138, a fulcrum block 140, a fulcrum bar 141, a first adjustable leg 146, a second adjustable leg 147, a first front wheel 148, a second front wheel 149, a first stabilizing arm 152, a second stabilizing arm 153, a lower adjustment rod 154, a first diagonal bar 164, a second diagonal bar 166, the clamp legs 172, 174, 176, and clamp levers 178, 180, 182, respectively.

Additionally, the jack and dolly device 200 employs two front wheel extenders 205, 210 which are mounted to the stabilizing arms 252, 253 via upper mounting plates 201, 206. Pillars 202, 207 are fastened to fasteners 204, 209 and attach the upper mounting plates 201, 206 to lower mounting plates 203, 208. The extenders 205, 210 utilize the pillars 202, 207 to create distance between the front wheels 248, 249 and the stabilizing arms 252, 253. This minimizes the size of the front wheels 248, 249 so that these wheels are less susceptible to breaking. It is to be appreciated that, as shown, the extenders 205, 210 are rotatable, thereby allowing for the eliminate of at least two of the front wheels. Additionally, in some embodiments, the pillars 202, 207 are extendable, which helps secure doors of different sizes.

The frame 212 also differs in that the carrying arms 217 are pushed outwardly and an additional inner square frame 291 is included to help stabilize heavy objects that are laid on top of the dolly 200 while the dolly 200 is in a horizontal position. It can also allow for objects to be wedged within the square frame member 291 at an angle. Additionally, the frame 212 can include an additional vertical support member 292 that attaches to the square frame member 291 and the foot member 238 and an additional horizontal support member 293 that helps further reinforce the carrying arms 217.

Additionally, the jack and dolly device 200 is given greater symmetry in that an additional adjustment rod 224B and adjusting plate 225B on the side of the jack and dolly device 200 opposite the where the first adjustment rod 224A and adjusting plate 225A were included.

From the foregoing, it can be seen that the present invention accomplishes at least all of the stated objectives.

LIST OF REFERENCE CHARACTERS

The following table of reference characters and descriptors are not exhaustive, nor limiting, and include reasonable equivalents. If possible, elements identified by a reference character below and/or those elements which are near ubiquitous within the art can replace or supplement any element identified by another reference character.

TABLE 1

| | List of Reference Characters |
|---|---|
| 100 | jack and dolly device |
| 112 | frame |
| 114 | securing mechanism |
| 115 | lock |
| 116 | knob |
| 117 | carrying arm |
| 118 | first upper wheel |
| 119 | second upper wheel |
| 120 | fulcrum frame |
| 122 | adjustable member (associated with fulcrum) |
| 124 | side adjustment rod |
| 125 | adjustment plate |
| 126 | brake handle |
| 128 | first attachment plate |
| 129 | second attachment plate |
| 130 | first large wheel |
| 131 | second large wheel |
| 132 | first lower rear wheel |
| 133 | second lower rear wheel |
| 134 | first lower rear wheel assembly |
| 135 | second lower rear wheel assembly |
| 136 | lower securing assembly |
| 138 | foot member |
| 140 | fulcrum block |
| 141 | fulcrum bar |
| 142 | brake assembly |
| 144 | first holding pin |
| 145 | second holding pin |
| 146 | first adjustable leg |
| 147 | second adjustable leg |
| 148 | first front wheel |
| 149 | second front wheel |
| 150 | first securing wheel |
| 151 | second securing wheel |
| 152 | first stabilizing arm |
| 153 | second stabilizing arm |
| 154 | lower adjustment rod |
| 156 | first lower rear lock |
| 158 | second lower rear lock |
| 160 | first side of frame |
| 162 | second side of frame |
| 164 | first diagonal bar |
| 166 | second diagonal bar |
| 168 | clamp |
| 170 | clamp body |
| 172 | first clamp leg |
| 174 | second clamp leg |
| 176 | third clamp leg |
| 178 | first clamp lever |
| 180 | second clamp lever |
| 182 | third clamp lever |
| 190 | door |
| 191 | operator |
| 192 | strap |
| 196 | assembled school door |
| 200 | another jack and dolly device |
| 201 | first upper mounting plate |
| 202 | first pillar(s) |
| 203 | first lower mounting plate |

TABLE 1-continued

| | List of Reference Characters |
|---|---|
| 204 | first fastener(s) |
| 205 | first wheel extender |
| 206 | second upper mounting plate |
| 207 | second pillar(s) |
| 208 | second lower mounting plate |
| 209 | second fastener(s) |
| 210 | second wheel extender |
| 212 | frame |
| 214 | securing mechanism |
| 216 | knob |
| 217 | carrying arm |
| 218 | first upper wheel |
| 219 | second upper wheel |
| 220 | fulcrum frame |
| 222 | adjustable member (associated with fulcrum) |
| 224A | first side adjustment rod |
| 224B | second side adjustment rod |
| 225A | first adjustment plate |
| 225B | second adjustment plate |
| 226 | brake handle |
| 228 | first attachment plate |
| 229 | second attachment plate |
| 230 | first large wheel |
| 231 | second large wheel |
| 232 | first lower rear wheel |
| 238 | foot member |
| 240 | fulcrum block |
| 241 | fulcrum bar |
| 246 | first adjustable leg |
| 247 | second adjustable leg |
| 248 | first front wheel |
| 249 | second front wheel |
| 252 | first stabilizing arm |
| 253 | second stabilizing arm |
| 254 | lower adjustment rod |
| 264 | first diagonal bar |
| 266 | second diagonal bar |
| 276 | at least one clamp leg |
| 282 | at least one clamp lever |
| 291 | inner square frame |
| 292 | vertical support member |
| 293 | horizontal support member |

GLOSSARY

Unless defined otherwise, all technical and scientific terms used above have the same meaning as commonly understood by one of ordinary skill in the art to which embodiments of the present invention pertain.

The terms "a," "an," and "the" include both singular and plural referents.

The term "or" is synonymous with "and/or" and means any one member or combination of members of a particular list.

The terms "invention" or "present invention" are not intended to refer to any single embodiment of the particular invention but encompass all possible embodiments as described in the specification and the claims.

The term "about" as used herein refers to slight variations in numerical quantities with respect to any quantifiable variable. Inadvertent error can occur, for example, through use of typical measuring techniques or equipment or from differences in the manufacture, source, or purity of components.

The term "substantially" refers to a great or significant extent. "Substantially" can thus refer to a plurality, majority, and/or a supermajority of said quantifiable variable, given proper context.

The term "generally" encompasses both "about" and "substantially."

The term "configured" describes structure capable of performing a task or adopting a particular configuration. The term "configured" can be used interchangeably with other similar phrases, such as "constructed", "arranged", "adapted", "manufactured", and the like.

Terms characterizing sequential order, a size, a position, and/or an orientation are only referenced according to the views presented, and, in some circumstances, such terms are only used to differentiate between elements. Such terms are not limiting.

The "scope" of the present invention is defined by the appended claims, along with the full scope of equivalents to which such claims are entitled. The scope of the invention is further qualified as including any possible modification to any of the aspects and/or embodiments disclosed herein which would result in other embodiments, combinations, subcombinations, or the like that would be obvious to those skilled in the art.

As used herein, the term "exemplary" refers to an example, an instance, or an illustration, and does not indicate a most preferred embodiment unless otherwise stated.

What is claimed is:

1. A jack and dolly assembly to aid in securing, transporting, and/or installing an object, comprising:
    a frame;
    a carrying arm supported by the frame;
    a securing mechanism mounted on the carrying arm wherein the securing mechanism is adapted to receive at least a portion of the object;
    an adjustable member in operable communication with the securing mechanism such that the securing mechanism can be manipulated by adjusting the adjustable member;
    one or more adjustable legs extending from a first side of the frame wherein the one or more adjustable legs are adapted to be able to extend and retract;
    one or more stabilizing arms, each mounted to one of the one or more adjustable legs; and
    one or more securing wheels, each securing wheel mounted to one of the one or more stabilizing arms, wherein the one or more securing wheels are adapted to receive at least another portion of the object.

2. The jack and dolly assembly of claim 1, further comprising a plurality of transportation wheels.

3. The jack and dolly assembly of claim 2, wherein the plurality of transportation wheels comprises a first lower rear wheel assembly and a second lower rear wheel assembly located at or near a corner of the frame formed where a first side and a second side of the frame meet.

4. The jack and dolly assembly of claim 3, wherein the first and second rear wheel assemblies are spring loaded.

5. The jack and dolly assembly of claim 2, wherein the plurality of transportation wheels comprises, a first front wheel, a second front wheel, a first upper wheel, and a second upper wheel wherein the front wheels are located at or near a distal end of a first side of the frame and the upper wheels are located at or near a distal end of a second side of the frame.

6. The jack and dolly assembly of claim 2, wherein the plurality of transportation wheels comprises a first large wheel and a second large wheel, wherein the first and second large wheels are pneumatic rubber tires adapted to be able to traverse many types of terrain and further wherein the first and second large wheels are located at or near a corner of the frame formed where first and second sides of the frame meet.

7. The jack and dolly assembly of claim 6, further comprising a brake assembly mounted on the frame wherein the brake assembly is in operable communication with at least one of the large wheels.

8. The jack and dolly assembly of claim 1, further comprising a foot member detachably mounted to the carrying arm.

9. The jack and dolly assembly of claim 1, further comprising a side adjustment rod mounted to the frame via an adjustment plate wherein the side adjustment rod is adapted to provide the ability to adjust the carrying arm.

10. The jack and dolly assembly of claim 1, further comprising a lower adjustment rod mounted to the frame wherein the lower adjustment rod is adapted to provide the ability to adjust the carrying arm.

11. A transportation and installation tool for use at a construction site, comprising:
    a frame wherein the frame is shaped generally as a capital letter "L" and comprises a first side and a second side;
    a carrying arm supported by the frame;
    a securing mechanism mounted on the carrying arm wherein the securing mechanism is adapted to receive at least a portion of an object; and
    a plurality of transportation wheels configured to allow the tool to be portable;
    wherein the plurality of transportation wheels is adapted to allow the tool to be transported in a vertical position and in a horizontal position;
    a first adjustable leg and a second adjustable leg, each extending from the first side of the frame wherein the adjustable legs are adapted to be able to extend and retract;
    a first stabilizing arm and a second stabilizing arm, each of the first and second stabilizing arms mounted to the first adjustable leg and the second adjustable leg, respectively; and
    a first securing wheel and a second securing wheel, each of the first securing wheel and the second securing wheel mounted to the first stabilizing arm and the second stabilizing arm, respectively, wherein the first securing wheel and the second securing wheel are adapted to receive at least another portion of the object.

12. The transportation and installation tool of claim 11, wherein the plurality of transportation wheels comprises a first upper wheel and a second upper wheel, each located at or near a distal end of the second side of the frame.

13. The transportation and installation tool of claim 11, wherein the plurality of transportation wheels comprises a first front wheel and a second front wheel, wherein the first front wheel is located at a distal end of the first adjustable leg and the second front wheel is located at a distal end of the second adjustable leg.

14. The transportation and installation tool of claim 11, wherein the plurality of transportation wheels comprises a first large wheel and a second large wheel, each located at or near a corner of the frame where the first and second sides of the frame meet.

15. The transportation and installation tool of claim 14, wherein the plurality of transportation wheels comprises a first lower rear wheel and a second lower rear wheel, wherein the first lower rear wheel is positioned adjacent to the first large wheel and the second lower rear wheel is positioned adjacent to the second large wheel.

16. A caddy assembly to aid in transportation and installation of objects for use at a construction site, comprising:
- a frame;
- a carrying arm supported by the frame; and
- a securing mechanism mounted on the carrying arm wherein the securing mechanism is adapted to receive at least a portion of an object;
- wherein positioning of the carrying arm can be adjusted;
- one or more adjustable legs extending from a first side of the frame wherein the one or more adjustable legs are adapted to be able to extend and retract;
- one or more stabilizing arms, each mounted to one of the one or more adjustable legs; and
- one or more securing wheels, each securing wheel mounted to one of the one or more stabilizing arms, wherein the one or more securing wheels are adapted to receive at least another portion of the object.

\* \* \* \* \*